(12) United States Patent
Fyffe et al.

(10) Patent No.: US 10,921,475 B2
(45) Date of Patent: Feb. 16, 2021

(54) SYSTEMS AND METHODS OF COUPLING UNDERWATER VEHICLE WITH UNDERWATER SENSOR STORAGE CONTAINER

(71) Applicant: Fairfield Industries Incorporated, Houston, TX (US)

(72) Inventors: Roger L. Fyffe, Sugar Land, TX (US); Etienne Marc, Houston, TX (US); Chance Mann, Houston, TX (US)

(73) Assignee: Magseis FF LLC, Houston, TX (US)

( * ) Notice: Subject to any disclaimer, the term of this patent is extended or adjusted under 35 U.S.C. 154(b) by 91 days.

(21) Appl. No.: 16/153,220

(22) Filed: Oct. 5, 2018

(65) Prior Publication Data
US 2020/0110187 A1    Apr. 9, 2020

(51) Int. Cl.
| B63G 8/00 | (2006.01) |
| G01V 1/38 | (2006.01) |
| B63G 8/04 | (2006.01) |
| B63G 8/08 | (2006.01) |
| B63G 8/39 | (2006.01) |

(52) U.S. Cl.
CPC ........... *G01V 1/3852* (2013.01); *B63G 8/001* (2013.01); *B63G 8/04* (2013.01); *B63G 8/08* (2013.01); *B63G 8/39* (2013.01); *G01V 1/3808* (2013.01); *B63G 2008/004* (2013.01)

(58) Field of Classification Search
CPC .............. B63B 2027/165; B63B 27/36; B63G 2008/008; G01V 1/3852; B64G 1/646
See application file for complete search history.

(56) References Cited

U.S. PATENT DOCUMENTS

| 2015/0239538 | A1 | 8/2015 | Jewell | |
| 2015/0284060 | A1* | 10/2015 | Jewell | B63B 27/00 114/322 |
| 2016/0375963 | A1* | 12/2016 | Tonnessen | G01V 1/38 701/21 |
| 2018/0162503 | A1 | 6/2018 | Reid et al. | |
| 2018/0252831 | A1* | 9/2018 | Hartland | G05D 1/0206 |

OTHER PUBLICATIONS

International Search Report and Written Opinion for PCT Appln. Ser. No. PCT/US2019/054349 dated Jun. 26, 2020 (24 pages).

* cited by examiner

*Primary Examiner* — Andrew Polay
(74) *Attorney, Agent, or Firm* — Foley & Lardner LLP; James De Vellis

(57) ABSTRACT

The present disclosure is directed to systems, methods, and apparatus for delivering seismic data acquisition units to, and retrieving from, an underwater vehicle. A sensor storage container can be tethered to a surface vessel, which can move on the surface with a non-zero velocity. The underwater vehicle can include a storage compartment to store seismic data acquisition units and a propulsion system to aid the movement of the underwater vehicle. The underwater vehicle also can include passive and active protrusions for coupling with corresponding receptacles on the sensor storage container. The sensor storage container also can include a propulsion system to aid movement of the sensor storage container. The propulsion systems of both the underwater vehicle and the sensor storage container can be controlled to allow the underwater vehicle and the sensor storage container to couple and allow transfer of seismic data acquisition units.

19 Claims, 15 Drawing Sheets

SYSTEMS AND METHODS OF COUPLING UNDERWATER VEHICLE WITH UNDERWATER SENSOR STORAGE CONTAINER

BACKGROUND

Seismic data may be evaluated to obtain information about subsurface features. The information can indicate geological profiles of a subsurface portion of earth, such as salt domes, bedrock, or stratigraphic traps, and can be interpreted to indicate a possible presence or absence of minerals, hydrocarbons, metals, or other elements or deposits.

SUMMARY

Performing an ocean bottom seismic survey to detect the presence or absence of minerals, hydrocarbons, metals, or other elements or deposits can include placing ocean bottom seismic data acquisition units on the ocean bottom or seabed. Depending on the size of the survey, hundreds, thousands, or more seismic data acquisition units may be deployed on the seabed at specific, predetermined locations. These seismic data acquisition units can remain on the seabed for a predetermined period of time to collect the seismic data. After the seismic data acquisition units have collected the data, the seismic data acquisition units can be retrieved from the seabed to acquire and analyze the data. For a large number of seismic data acquisition units deployment to, and the retrieval from, the seabed can be time consuming. In some examples, a surface vessel can deploy an underwater vehicle for deployment and retrieval of seismic data acquisition units from the bottom of the seabed. The underwater vehicle may have limited capacity for housing seismic data acquisition units. As a result, the underwater vehicle may have to be raised to the surface to load seismic data acquisition units from or offload seismic data acquisition units to the surface vessel. The repeated raising and lowering of the underwater vehicle can consume a lot of time, which is in addition to the time it may take to deploy and retrieve the seismic data acquisition units from the seabed.

Systems and methods of the present technical solution provide a system that includes another subsurface vehicle such as a sensor storage container. The sensor storage container can store multiple seismic data acquisition units. For a loading operation, the sensor storage container can be preloaded with seismic data acquisition units while on or adjacent the surface vessel. The sensor storage container can then be lowered to a subsurface location, where the sensor storage container can couple with the underwater vehicle and transfer the stored seismic data acquisition units to the underwater vehicle. For a retrieval operation, the sensor storage container can mate with and receive from the underwater vehicle seismic data acquisition units that have been retrieved from the seabed. The reload and retrieval operations can be carried out using the storage container while the surface vessel is moving. Using the storage container to reload seismic data acquisition units to the underwater vehicle or to offload seismic data acquisition units from the underwater vehicle reduces the time needed to carry out the seismic survey. In particular, using the storage container eliminates the need to bring the underwater vehicle to the surface for loading or offloading of seismic data acquisition units. As a result the time spent in bringing up and sending down the underwater vehicle can be saved. Further mechanical stresses placed on equipment utilized to lift and lower the underwater vehicle are reduced as the underwater vehicle can operate below the surface for longer periods.

At least one aspect of the present technical solution is directed to a system to interface underwater components in a seismic survey. The system includes an underwater vehicle and a sensor storage container. The underwater vehicle is located in an aqueous medium, and includes a storage compartment storing a plurality of seismic data acquisition units. The underwater vehicle further includes a propulsion system to move the underwater vehicle. The underwater vehicle further includes a passive protrusion extending from the underwater vehicle, and an active protrusion extending from the underwater vehicle, the active protrusion including a mechanical coupling pin that moves from a first position to a second position to provide a locking mechanism. The sensor storage container is located in the aqueous medium and tethered, via a cable, to a marine vessel that travels with a velocity greater than zero. The storage container can include a passive receptacle to receive the passive protrusion from the underwater vehicle, and an active receptacle to receive the active protrusion and the mechanical coupling pin to provide the locking mechanism to couple the storage container with the underwater vehicle. The sensor storage container and the underwater vehicle are coupled to one another above a seabed and below a surface of the aqueous medium. Further, the underwater vehicle transfers at least one of the plurality of seismic data acquisition units from the storage compartment to the sensor storage container coupled with the underwater vehicle via the passive protrusion and the passive receptacle and the active protrusion and the active receptacle.

At least one aspect of the present technical solution is directed to a system to interface underwater components in a seismic survey. The system includes an underwater vehicle located in an aqueous medium and a sensor storage container located in the aqueous medium and tethered, via a cable, to a marine vessel that travels with a velocity greater than zero. The underwater vehicle includes a storage compartment storing a plurality of seismic data acquisition units. The underwater vehicle further includes a propulsion system to move the underwater vehicle. The underwater vehicle also includes a first passive interlocking-mechanism, a second passive interlocking mechanism, and a first active interlocking mechanism. The sensor storage container includes a third passive interlocking mechanism to couple with the first passive interlocking mechanism. The sensor storage container also includes a fourth passive interlocking mechanism to couple with the second passive interlocking mechanism, and a second active interlocking mechanism to couple with the first active interlocking mechanism. The underwater vehicle transfers at least one of the plurality of seismic data acquisition units from the storage compartment to the sensor storage container coupled with the underwater vehicle, where the sensor storage container and the underwater vehicle are coupled to one another above a seabed and below a surface of the aqueous medium At least one aspect is directed to a method of interfacing underwater components in a seismic survey. The method includes providing an underwater vehicle located in an aqueous medium. The underwater vehicle includes a storage compartment storing a plurality of seismic data acquisition units. The underwater vehicle further includes a propulsion system to move the underwater vehicle towards a sensor storage container. The underwater vehicle also includes a first passive interlocking-mechanism. The underwater vehicle further includes a second passive interlocking mechanism, and a first active interlocking mechanism. The method further includes providing the sensor storage container located in the aqueous medium and tethered, via a cable, to a marine vessel traveling with a velocity greater than zero. The storage container includes a third passive interlocking mechanism to couple with the first passive interlocking mechanism. The sensor storage container also includes a fourth passive interlocking mechanism to couple with the second passive interlocking mechanism. The sensor storage container also includes a second active interlocking mechanism to couple with the first active interlocking mechanism. The method further includes transferring, from the underwater vehicle to the sensor storage container coupled with the underwater vehicle above a seabed and below a surface of the aqueous medium, at least one of the plurality of seismic data acquisition units from the storage compartment.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims. The drawings are not intended to be drawn to scale. Like reference numbers and designations in the various drawings indicate like elements. For purposes of clarity, not every component may be labeled in every drawing. In the drawings:

DETAILED DESCRIPTION

Following below are more detailed descriptions of various concepts related to, and implementations of, methods, apparatuses, and systems for delivering seismic nodes to an ocean bottom using an underwater vehicle. The various concepts introduced above and discussed in greater detail below may be implemented in any of numerous ways.

Systems, methods, and apparatus of the present disclosure generally relate to delivering seismic data acquisition units to, and retrieving seismic data acquisition units from, an underwater vehicle used for deployment and retrieval of seismic data acquisition units or nodes to and from the ocean bottom. A sensor storage container can be tethered to a surface vessel, which can move on the surface with a non-zero velocity. The underwater vehicle can include a storage compartment to store seismic data acquisition units and a propulsion system to aid the movement of the underwater vehicle. The underwater vehicle also can include passive and active protrusions for coupling with corresponding receptacles on the sensor storage container. The sensor storage container also can include a propulsion system to aid movement of the sensor storage container. The propulsion systems of both the underwater vehicle and the sensor storage container can be controlled to allow the underwater vehicle and the sensor storage container to couple and allow transfer of seismic data acquisition units.

Figure 1:
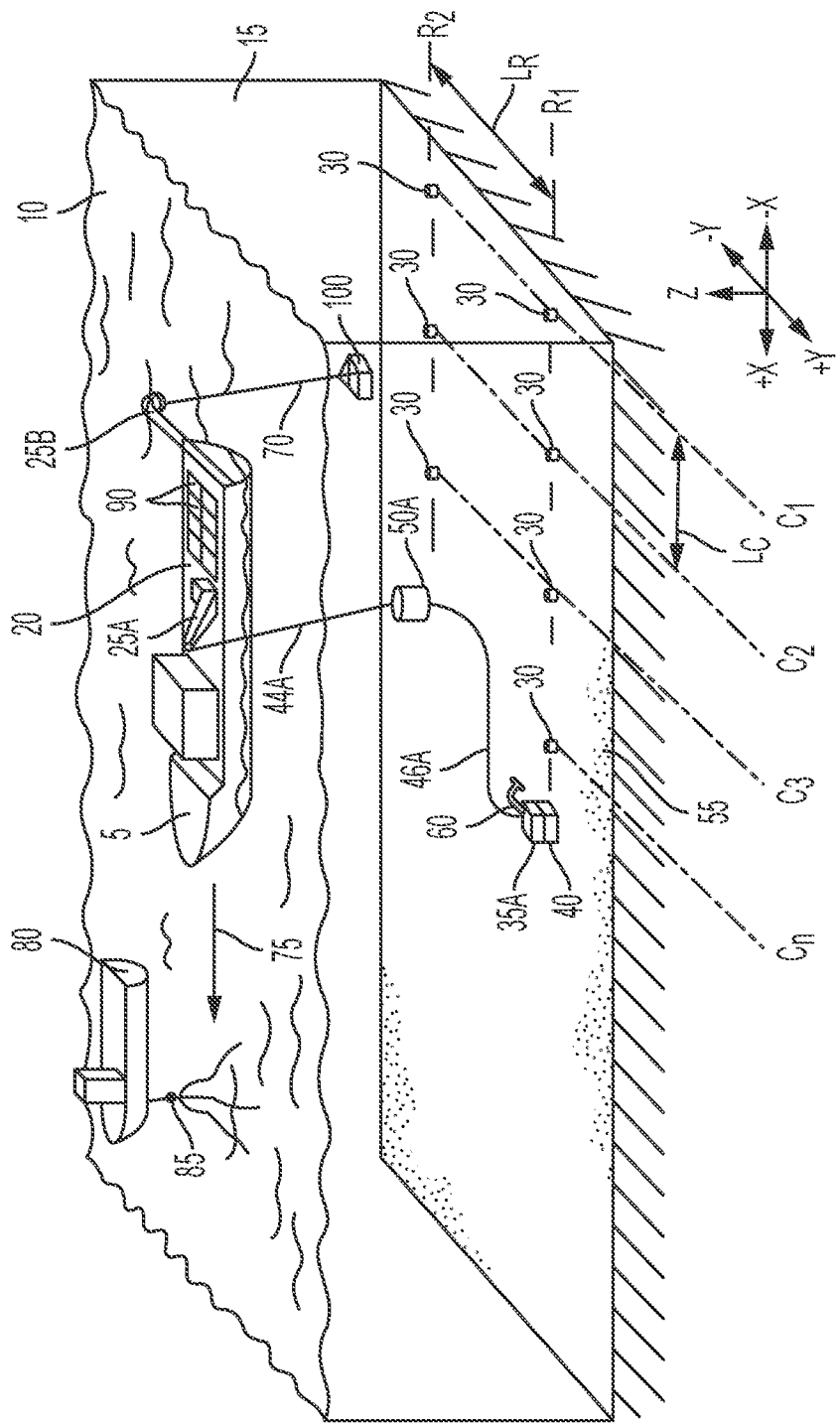
FIG. 1 is an isometric schematic view of an embodiment of a seismic operation in deep water.

Referring now to FIG. 1, an isometric schematic view of an embodiment of a seismic operation in deep water facilitated by a first marine vessel 5 is shown. The data processing system can obtain the seismic data via the seismic operation. While this figure illustrates a deep water seismic operation, the systems and methods described herein can use seismic data obtained via streamer data, land-based seismic operations. In this example, the first vessel 5 is positioned on a surface 10 of a water column 15 (also referred to as an "aqueous medium") and includes a deck 20 which supports operational equipment. At least a portion of the deck 20 includes space for a plurality of sensor device racks 90 where seismic sensor devices (or seismic data acquisition units or nodes) are stored. The sensor device racks 90 may also include data retrieval devices or sensor recharging devices.

The deck 20 also includes one or more cranes 25A, 25B attached thereto to facilitate transfer of at least a portion of the operational equipment, such as an underwater vehicle, an autonomous underwater vehicle (AUV), autonomously operated vehicle (AOV), a remotely operated underwater vehicle (ROV) or seismic sensor devices, from the deck 20 to the water column 15. An underwater vehicle can refer to or include a ROV 35A, AUV, or AOV. For example, a crane 25A coupled to the deck 20 is configured to lower and raise an ROV 35A, which transfers and positions one or more sensor devices 30 (e.g., ocean bottom seismometer "OBS" units, seismic data acquisition units, or nodes) on a seabed 55. The ROV 35A can be coupled to the first vessel 5 by a tether 46A and an umbilical cable 44A that provides power, communications, and control to the ROV 35A. A tether management system (TMS) 50A is also coupled between the umbilical cable 44A and the tether 46A. Generally, the TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon. The seabed 55 can include or refer to a continental shelf.

A crane 25B may be coupled (e.g., via a latch, anchor, nuts and bolts, screw, suction cup, magnet, or other fastener.) to a stern of the first vessel 5, or other locations on the first vessel 5. Each of the cranes 25A, 25B may be any lifting device or launch and recovery system (LARS) adapted to operate in a marine environment. The crane 25B may be coupled to a seismic sensor transfer device 100 (also referred to as "a sensor storage container") by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. The transfer device 100 may be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system. In some embodiments, the transfer device 100 may not include any integral power devices or not require any external or internal power source. In some embodiments, the cable 70 may provide power or control to the transfer device 100. In some embodiments, the transfer device 100 can operate without external power or control. In some embodiments, the cable 70 may include an umbilical, a tether, a cord, a wire, a rope, and the like, that is configured to support, tow, position, power or control the transfer device 100.

The ROV 35A can include a seismic sensor device storage compartment 40 that is configured to store one or more seismic sensor devices 30 therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. In one embodiment, the seismic sensor devices 30 may be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. In some embodiments, the seismic sensor devices 30 may be deployed and retrieved from the storage compartment 40 by a robotic device 60, such as a robotic arm, an end effector or a manipulator, disposed on the ROV 35A.

The seismic sensor device 30 may be referred to as seismic data acquisition unit 30 or node 30. The seismic data acquisition unit 30 can record seismic data. The seismic data acquisition unit 30 may include one or more of at least one geophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit. During recording, the seismic sensor device 30 may operate in a self-contained manner such that the node does not require external communication or control. The seismic sensor device 30 may include several geophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A can utilize commands from personnel on the first vessel 5 to operate along a course to transfer the first plurality of seismic sensor devices 30 from the storage compartment 40 and deploy the individual sensor devices 30 at selected locations on the seabed 55 or ground surface 55 or sea floor 55 or earth surface 55 in a land based deployment. Once the storage compartment 40 is depleted of the first plurality of seismic sensor devices 30, the transfer device 100 (or transfer system 100) can be used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. In one embodiment, reloading of the storage compartment 40 is provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 needs to be reloaded. This process may repeat as needed until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55. The retrieved seismic sensor devices 30 are placed into the storage compartment 40 of the ROV 35A. In some embodiments, the ROV 35A may be sequentially positioned adjacent each seismic sensor device 30 on the seabed 55 and the seismic sensor devices 30 are rolled, conveyed, or otherwise moved from the seabed 55 to the storage compartment 40. In some embodiments, the seismic sensor devices 30 may be retrieved from the seabed 55 by a robotic device 60 disposed on the ROV 35A.

Once the storage compartment 40 is full or contains a pre-determined number of seismic sensor devices 30, the transfer device 100 can be lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 can ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, mechanical stresses placed on equipment related to the ROV 35A are minimized as the ROV 35A may be subsurface for longer periods.

In this embodiment, the first vessel 5 may travel in a first direction 75, such as in the +X direction, which may be a compass heading or other linear or predetermined direction. The first direction 75 may also account for or include drift caused by wave action, current(s) or wind speed and direction. In one embodiment, the plurality of seismic sensor devices 30 are placed on the seabed 55 in selected locations, such as a plurality of rows Rn in the X direction (R1 and R2 are shown) or columns Cn in the Y direction (C1, C2, C3, and C4 are shown), wherein n equals an integer. In one embodiment, the rows Rn and columns Cn define a grid or array, wherein each row Rn comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be pre-determined or result from other factors, such as topography of the seabed 55. In some embodiments, the distances LR and LC may be substantially equal (e.g., plus or minus 10% of each other) and may include dimensions between about 60 meters to about 400 meters. In some embodiments, the distances LR and LC may be different. In some embodiments, the distances LR or LC may include dimensions between about 400 meters to about 1100 meters. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed is typically limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. For example, when two receiver lines (rows R1 and R2) are being laid, the first vessel includes a first speed of between about 0.2 knots and about 0.6 knots. In some embodiments, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 can be used to provide a source signal. The second vessel 80 can be provided with a source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 can be shorter than the deployment time of the second receiver line. This causes a lag time in the seismic survey as the second vessel 80 sits idle while the first vessel 5 is completing the second receiver line.

In some embodiments, the first vessel 5 can utilize an ROV 35A to lay sensor devices to form a first set of two receiver lines (rows R1 and R2) in any number of columns, which may produce a length of each receiver line of up to and including several miles. The two receiver lines (rows R1 and R2) can be substantially parallel, e.g. within +/−20 degrees of parallel. When a single directional pass of the first vessel 5 is completed and the first set (rows R1, R2) of seismic sensor devices 30 are laid to a predetermined length, the second vessel 80, provided with the source device 85, is utilized to provide the source signal. The second vessel 80 may make eight or more passes along the two receiver lines to complete the seismic survey of the two rows R1 and R2.

While the second vessel 80 is shooting along the two rows R1 and R2, the first vessel 5 may turn 180 degrees and travel in the −X direction in order to lay seismic sensor devices 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array is typically limited by the length of the tether 46A or the spacing (distance LR) between sensor devices 30.

Figure 2:
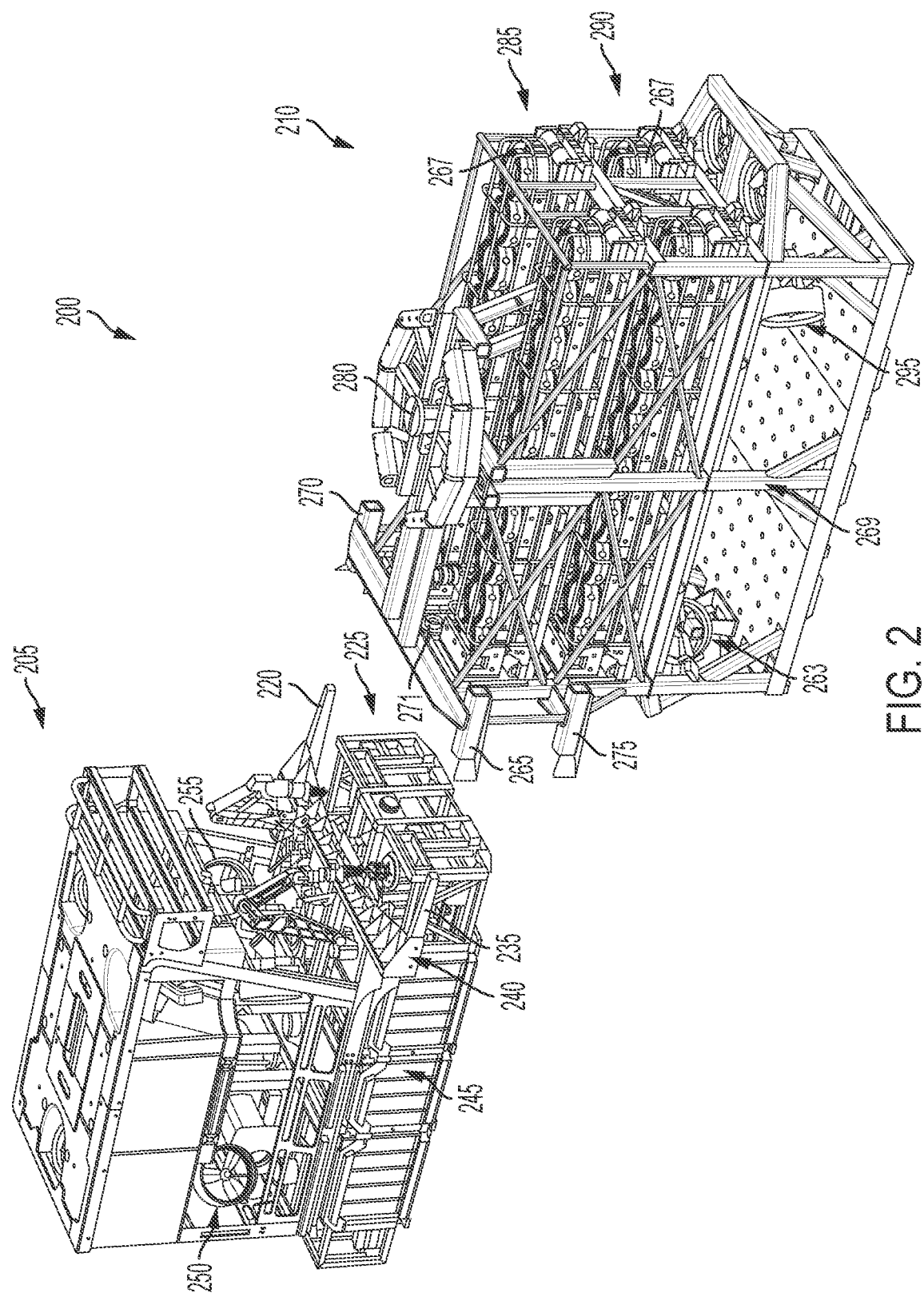
FIG. 2 shows an isometric view of a system to interface underwater components in a seismic survey in accordance with an embodiment.

FIG. 2 shows an isometric view of a system 200 to interface underwater components in a seismic survey. The system 200, for example, can include an underwater vehicle 205 and a sensor storage container 210. The underwater vehicle 205 and the sensor storage container 210 can be similar to the ROV 35A and the seismic sensor transfer device 100 discussed above in relation to FIG. 1. The underwater vehicle 205 can refer to or include one or more component or functionality of ROV 35A, AOV or AUV. While not shown in FIG. 2, the system 200 may also include a surface vessel, such as the vessel 5 discussed above in relation to FIG. 1. In some examples, the underwater vehicle 205 can be tethered to the surface vessel, or be untethered and operate autonomously. Similarly, the sensor storage container 210 can be tethered to the surface vessel or be untethered and operate autonomously.

The underwater vehicle 205 can include an underwater vehicle chassis 240 on which various components of the underwater vehicle 205 can be mounted. The underwater vehicle 205 can include an underwater vehicle storage compartment 245 that can be utilized for storing seismic data acquisition units. The underwater vehicle storage compartment 245 can include an open end 225 through which seismic data acquisition units can be stored into and removed from the underwater vehicle storage compartment 245. The underwater vehicle 205 further includes an underwater vehicle propulsion system 250 that includes thrusters 255, which when activated provide motion to the underwater vehicle 205 in the desired direction. The underwater vehicle 205 further includes two passive protrusions: a first passive protrusion 235 and a second passive protrusion 220, both of which extend from the underwater vehicle 205. In particular, the first passive protrusion 235 and the second passive protrusion 220 extend out of the underwater vehicle chassis 240. The underwater vehicle 205 also includes an active protrusion 230, which also extends from the underwater vehicle 205. The active protrusion 230 extends in the same direction with respect to the underwater vehicle 205 as the first passive protrusion 235 and the second passive protrusion 220.

Figure 15:
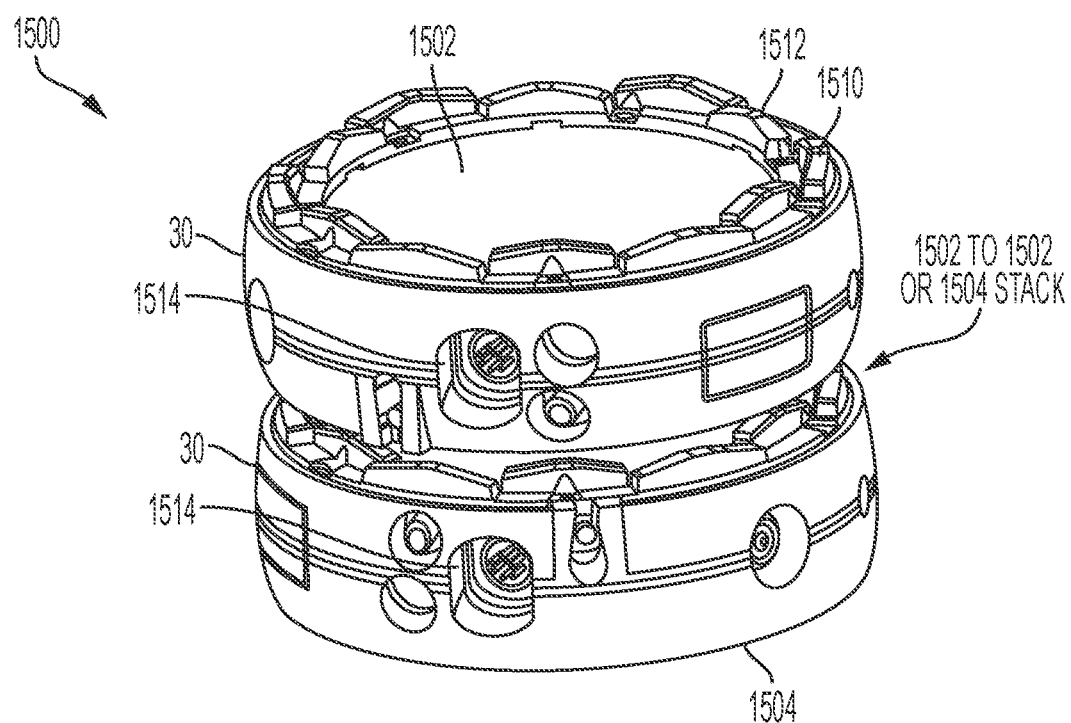
FIG. 15 is an illustration of stacked seismic data acquisition units, in accordance with an embodiment.

The underwater vehicle storage compartment 245 can store a plurality of seismic data acquisition units, which can include a first seismic data acquisition unit stacked on a second seismic data acquisition unit via one or more cleat rings, as depicted in FIG. 15. FIG. 15 depicts a stacked configuration 1500 with a first seismic data acquisition unit 30 stacked one on top of a second seismic data acquisition unit 30. The seismic data acquisition units 30 can include a first side 1502 (or top side) and a second side 1504 (or bottom side). The seismic data acquisition units can be stacked first side 1502 to first side 1502, or first side 1502 to second side 1504, or second side 1504 to second side 1504.

For example, the seismic data acquisition unit 30 can have a first side 1502. The first side 1502 can be referred to as a top side. The seismic data acquisition unit 30 can have a second side 1504, which can be referred to as a bottom side.

The seismic data acquisition unit 30 can be disk shaped. For example, the seismic data acquisition unit 30 can have a width or diameter that is greater than a height. For example, the diameter (or width) can range from 10 inches to 30 inches. The height can range from 5 inches to 20 inches. In some cases, the diameter can be less than or equal to 20 inches, and the height can be less than or equal to 10 inches. For example, a configuration of the seismic data acquisition unit 30 can include a diameter of 19.9 inches and a height of 10 inches; a diameter of 21 inches and a height of 10.5 inches; a diameter of 12 inches and a height of 4 inches; or a diameter of 17 inches and a height of 6 inches, for example. The seismic data acquisition unit 30 can be circular, rectangular, oval, octagonal, pentagonal, polygonal, or have another shape that facilitates seismic data acquisition.

The seismic data acquisition unit 30 can include first cleats 1510 and second cleats 1512. The first cleats 1510 can form a first cleat ring, and the second cleats 1512 can form a second cleat ring. First cleats 1510 can be referred to as outer cleats, and second cleats 1512 can be referred to as inner cleats. The outer cleats can be positioned on a perimeter of the seismic data acquisition unit 30, while the inner cleats can be form an inner cleat ring adjacent or proximate to the outer cleats. The first and second cleat rings can be coupled to the first side 1502 of the seismic data acquisition unit 30. The first and second cleat rings can be coupled to the second side 1504 of the seismic data acquisition unit 30. The cleats 1510 and 1512 can be positioned such that they do not overlap.

The seismic data acquisition unit 30 can include a cap free subsea connector 1514. The connector 1514 can be placed on a side of the seismic data acquisition unit 30. The connector 1514 can be placed on a side that is not the first side 1502 or the second side 1504. The connector 1514, or cap free subsea connector, can include multiple components, such as a snap ring, pin interconnect and socket insert. The connector 1514 can be designed and constructed to be cap free, thereby reducing the amount of space the seismic data acquisition unit 30 occupies, either in a storage container or transfer container. Removing the cap can also allow for easier access to the electronic circuitry and allow an electrical communication to be established faster and more easily.

The sensor storage container 210 includes a sensor storage container chassis 269 on which various components of the sensor storage container 210 can be mounted. The sensor storage container 210 includes a tether coupling mechanism 280 on a top of the sensor storage container chassis 269. The tether coupling mechanism 280 can receive one end of tether (such as, for example, the cable 70 shown in FIG. 1) the other end of which can be coupled to a surface vessel (such as, for example, the vessel 5 shown in FIG. 1). The sensor storage container 210 further includes a first passive receptacle 265 and a second passive receptacle 270 that receive that can receive the first passive protrusion 235 and the second passive protrusion 220, respectively, of the underwater vehicle 205. The sensor storage container 210 also can include an active receptacle 271 that can receive the active protrusion 230 of the underwater vehicle 205. The sensor storage container 210 further includes a propulsion system 295 coupled to the sensor storage container chassis 269. The sensor storage container propulsion system 295 can include thrusters 263, which when activated provide motion to the sensor storage container 210 in the desired direction.

The sensor storage container 210 further includes a first storage platform 285 and a second storage platform 290 for storing seismic data acquisition units 267. The first storage platform 285 can be positioned over the second storage platform 290. The first storage platform 285 is positioned in relation to the first passive receptacle 265, the second passive receptacle 270, and the active receptacle 271 such that when the first passive protrusion 235, the second passive protrusion 220 and the active protrusion 230 of the underwater vehicle 205 couple with the first passive receptacle 265, the second passive receptacle 270, and the active receptacle 271, respectively, the first storage platform 185 is aligned with the underwater vehicle storage compartment 245 to allow transfer of seismic data acquisition units 267 between the sensor storage container 210 and the underwater vehicle 205. The sensor storage container 210 also includes a third passive receptacle 275, a fourth passive receptacle, and a second active receptacle. The second platform 290 is positioned in relation with the third passive receptacle 275, the fourth passive receptacle, and the second active receptacle such that when the first passive protrusion 235, the second passive protrusion 220 and the active protrusion 230 couples of the underwater vehicle 205 couple with the third passive receptacle 275, the fourth passive receptacle, and the second active receptacle, the second storage platform 290 is aligned with the underwater vehicle storage compartment 245 to allow transfer of seismic data acquisition units 267 between the sensor storage container 210 and the underwater vehicle 205.

Figure 3:
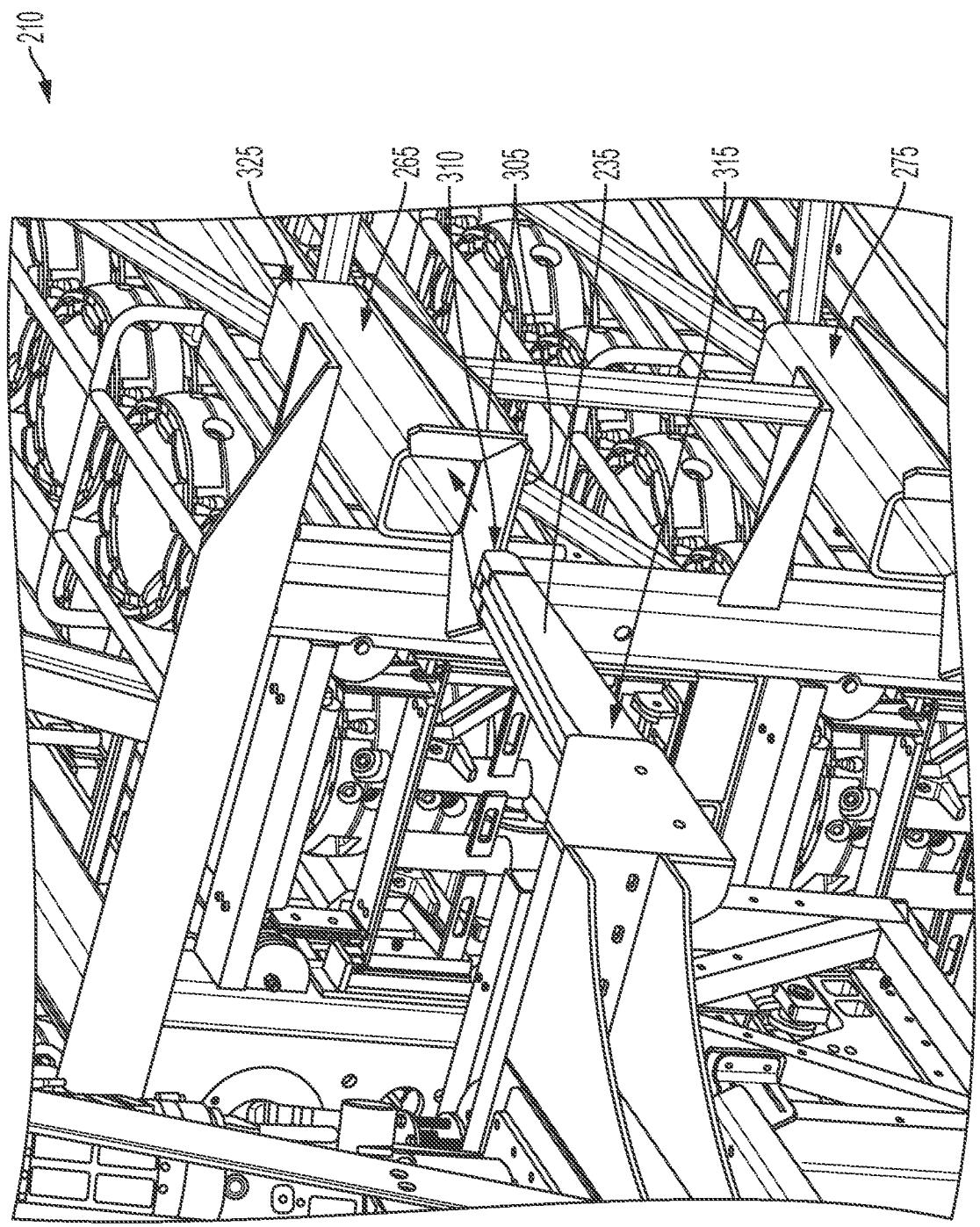
FIG. 3 depicts an expanded isometric view of the system shown in FIG. 2.

FIG. 3 depicts an expanded isometric view of the system 200 shown in FIG. 2. In particular, FIG. 3 shows the underwater vehicle 205 and the sensor storage container 210 positioned such that the first passive protrusion 235 is aligned with the first passive receptacle 265. The first passive protrusion 235 can be an elongated member having a first end 310 and a second end 315. The second end 315 of the first passive protrusion 235 is attached to the underwater vehicle chassis 240, while the first end 310 is positioned to couple with the first passive receptacle 265. The first passive protrusion 235 can be tapered along its length such that the first passive protrusion 235 gets progressively narrower from the second end 315 to the first end 310. In some examples, the tapered shape and the narrower first end 310 can improve the ability of the first passive protrusion 235 to mate with the first passive receptacle 265. In some instances, the first passive protrusion 235 can have uniform cross-sectional area throughout its length. In some examples, the second passive protrusion 220 can be similar in size and shape to the first passive protrusion 235.

The first passive receptacle 265 can have a hollow cylindrical shape having a first end 320 and a second end 325. The first end 320 is positioned towards a front side of the sensor storage container 210, while the second end 325 is positioned to face a rear side of the sensor storage container 210. The first passive receptacle 265 can have an open first end that can be sized to be larger than the size of the first end 310 of the first passive protrusion 235. The first passive receptacle 265 can have a uniform cross-sectional area throughout its length. In some examples, the first passive receptacle 265 can have non-uniform cross-sectional area along its length, such that the cross-sectional area at the first end 320 is greater than the cross-sectional area at the second end 325. In some instances, the second end 325 can be closed. In some examples, the second end 325 can be open to allow the first end of the 310 to extend beyond the second end 325. The first passive receptacle 265 can include a flared guide member 305 attached to the first end 320. The flared guide member 305 can include at least one plate that is positioned at an angle in relation to a longitudinal axis of the first passive receptacle 265. The at least one flared guide member 305 can form a funnel (whole or partial) with the narrow end attached to the first end 320. The at least one flared guide member 305 can improve the ability of the first passive protrusion 235 to enter the first passive receptacle 265 through the first end 320 during coupling between the underwater vehicle 205 and the sensor storage container 210. In some examples, the second passive receptacle 270, the third passive receptacle 275 and the fourth receptacle (not shown) can have shapes and sizes similar to that of the first passive receptacle 265.

Figure 4:
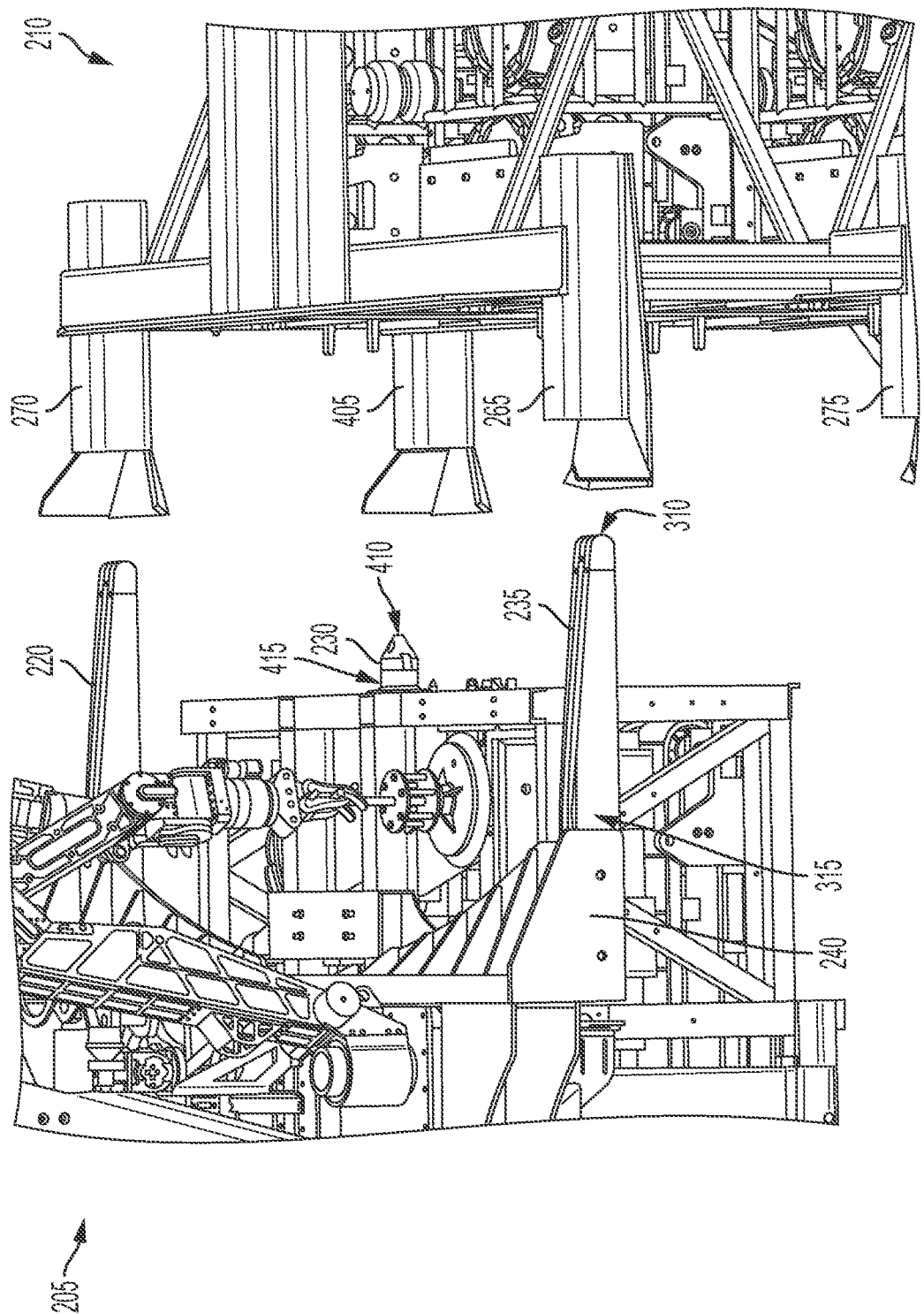
FIG. 4 depicts another isometric view of the system shown in FIG. 2.

FIG. 4 depicts another isometric view of the system 200 shown in FIG. 2. In particular, FIG. 4 shows the underwater vehicle 205 positioned with respect to the sensor storage container 210 such that the first passive protrusion 235 and the second passive protrusion 220 of the underwater vehicle 205 are aligned with the first passive receptacle 265 and the second passive receptacle 270 of the sensor storage container 210. The first passive protrusion 235 can have a length 420 between the first end 310 and the second end 315. In some instances, the first passive receptacle 265 can have a length 425 that is greater than the length 420 of the first passive protrusion 235, such that when the underwater vehicle 205 is coupled to the sensor storage container 210, the first end 310 does not go beyond the second end 325 of the first passive receptacle 265. In some examples, the length 425 of the first passive receptacle 265 can be less than the length 420 of the first protrusion such that when the underwater vehicle 205 is coupled to the sensor storage container 210, the first end 310 of the first passive protrusion 235 is positioned within the first passive receptacle 265.

The active protrusion 230 can have a first end 410 and a second end 415, which is attached to the underwater vehicle chassis 240. The active protrusion 230 can provide a locking mechanism that can engage with the active receptacle (271, FIG. 2) of the sensor storage container 210. The active protrusion 230 can have a non-uniform cross-sectional area along its length. For example, the first end 410 of the active protrusion 230 can have a cross-sectional area that is less than a cross-sectional area of the second end 415. The active protrusion 230 can have a tapered shape that narrower at the first end 410 than at the second end 415. In some examples, the active protrusion 230 can have uniform cross-sectional area. In some examples, the active protrusion 230 can include a mechanical coupling pin that moves from a first position to a second position. In the first position, the mechanical coupling pin can engage with the active receptacle of the sensor storage container 210 to lock the underwater vehicle 205 and the sensor storage container 210 in a mating position. In the second position the mechanical coupling pin can disengage with the active receptacle of the sensor storage container 210 to unlock the underwater vehicle 205 and the sensor storage container 210 from the mating position.

Figure 5:
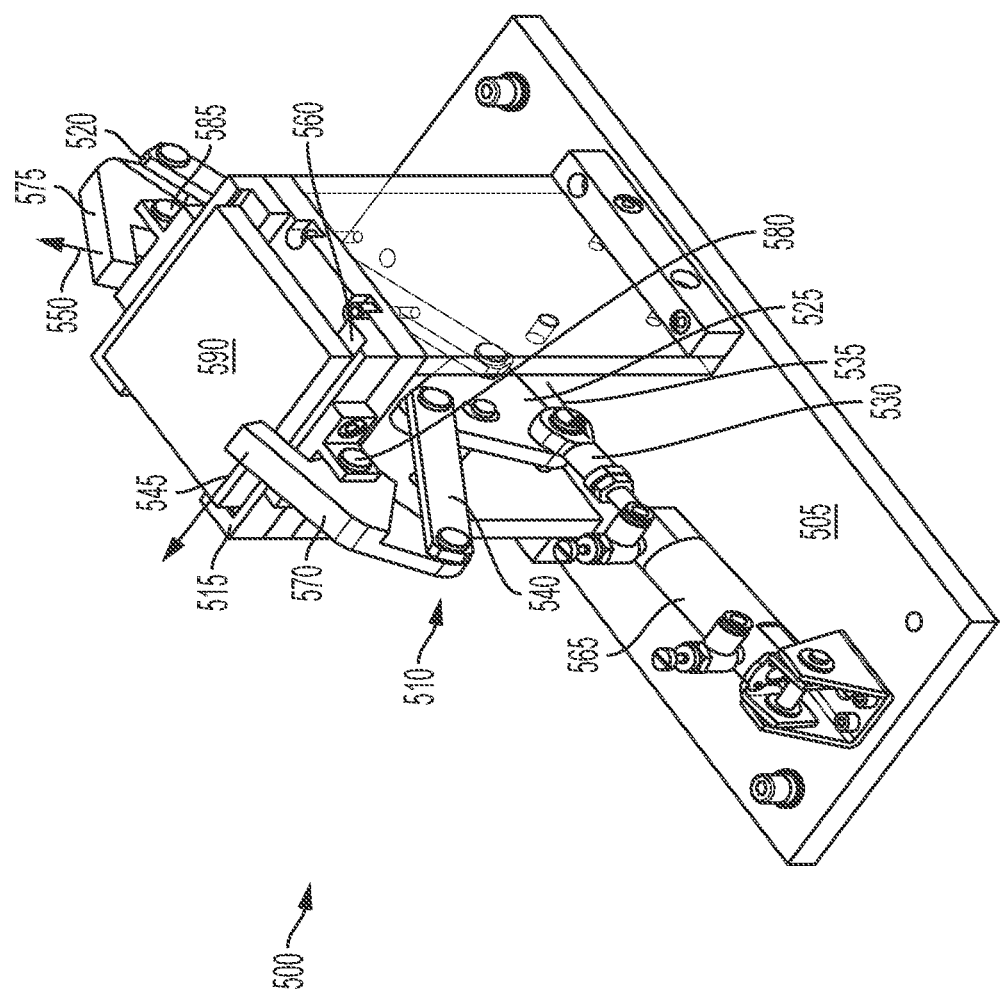
FIG. 5 shows an example active protrusion in accordance with an embodiment.

FIG. 5 shows an example active protrusion 500. The active protrusion 500 can be used to implement the active protrusion 230 discussed above in relation to FIGS. 2-4. The active protrusion 500 can include a base 505 that can be coupled to a underwater vehicle chassis, such as, for example, the underwater vehicle chassis 240 shown in FIG. 2. A platform 515 is attached to the base 505 and includes an engaging surface 560 positioned on the top of the platform 515. The platform 515 and the base 505 support an mechanical assembly 510 that can be used to move the first mechanical pin 570 and a second mechanical pin 575 between at least a first position and a second position. The mechanical assembly 510 can include a hydraulic pump 565, which when activated, causes a movement of a piston 530.

One end of the piston 530 is coupled to a cantilever shaft 525, to which a first link 540 and a second link 520 are coupled. The first link 540 is in turn coupled to the first mechanical pin 570, while the second link is in turn coupled to the second mechanical pin 575. The first mechanical pin 570 and the second mechanical pin 575 are coupled to the platform 515 via a first hinge 580 and a second hinge 585, respectively. FIG. 5 shows the first mechanical pin 570 and the second mechanical pin 575 in a first position. In the first position, the first mechanical pin 570 and the second mechanical pin 575 can engage with a corresponding active receptacle on the sensor storage container 210, such as the active receptacle 271 shown in FIG. 2. For simplicity, only a portion of the active receptacle 271 in the form of a plate 590 is shown in FIG. 5. The plate 590 can be positioned on the engaging surface 560 and is held in place by the first pin 570 and the second pin 575.

The hydraulic pump 565 can be actuated to move the piston 530 in the direction of the arrow 535. This causes the cantilever shaft 525 to rotate in a clockwise direction. The movement of the cantilever shaft 525, in turn, can cause the first link 540 to move away from the hydraulic pump 565, and can cause the second link 520 to move towards the hydraulic pump 565. As the first mechanical pin 570 is hinged to the platform 515, the movement of the first link 540 can cause the first pin 570 to lift in a direction 545 away from the plate 590. Similarly, the movement of the second link 520 can cause the second pin 575 to lift in a direction 550 away from the plate 590. The hydraulic pump 565 can be actuated to move the piston 530 to the extent that the first pin 570 and the second pin 575 move in their respective directions 545 and 550 into a second position in which the plate 590 of the active receptacle is released, thereby disengaging the underwater vehicle 205 form the sensor storage container 210.

To engage with the active receptacle, the hydraulic pump 565 can be actuated to position the first mechanical pin 570 and the second mechanical pin 575 in the second position. When the plate 590 of the active receptacle is received on the engaging surface 560, the hydraulic pump 565 can be actuated such that the piston 530 moves in a direction that is opposite to the direction shown by the arrow 535. This can cause the first mechanical pin 570 and the second mechanical pin 575 to move in a direction that is opposite to the directions indicated by the arrows 545 and 550, respectively. The hydraulic pump 565 can be continued to be actuated such that the plate 590 of the active receptacle is securely held under the first mechanical pin 570 and the second mechanical pin 575. The hydraulic pump 565 places the first pin 570 and the second pin 575 in the first position, in which the first pin 570 and the second pin 575 hold the plate 590 the active receptacle in place over the engaging surface 560, the hydraulic pump 565 can be locked in position, thereby locking the active receptacle.

In some examples, the active protrusion 500 can include a self-locking mechanism to couple first or second mechanical coupling pins 570 and 575 with the active receptacle of the sensor storage container 210. For example, the active protrusion 500 can be configured such that when the plate 590 from the active receptacle 271 makes contact with the engaging surface 560, the first mechanical pin 570 and the second mechanical pin 575 automatically move in a direction opposite to that indicated by the arrows 545 and 550 and press downward on the plate 590 to secure the plate 590 against the engaging surface 560. In one example, the automatic movement of the mechanical pins 570 and 575 can be facilitated by a mechanical switch positioned on the engaging surface 560 that when activated by the plate 590 of the active receptacle 230, actuates the hydraulic pump 565 to cause the first and second mechanical pins 570 and 575 to press downwards on the plate 590.

Figure 6:
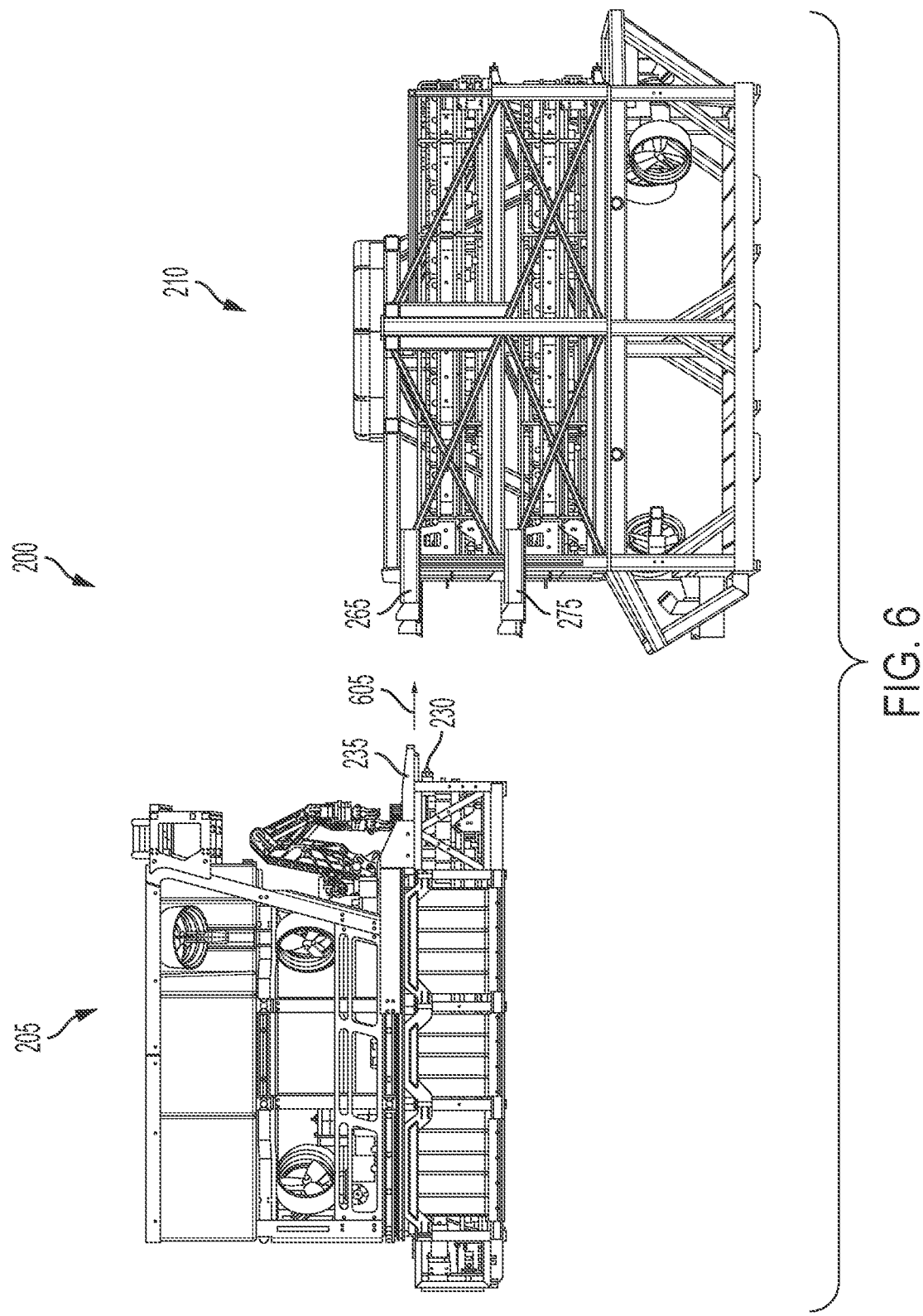
FIG. 6 depicts a side view of the system shown in FIG. 2.

FIG. 6 depicts a side view of the system 200 shown in FIG. 2. In particular, FIG. 6 depicts the underwater vehicle 205 and the sensor storage container 210 underwater in an uncoupled position. The underwater vehicle 205 can have a relative velocity in relation to the sensor storage container 210 that results in the underwater vehicle 205 moving in the direction 605 towards the sensor storage container 210. In some examples, the direction of motion of the underwater vehicle 205 can be the same as the direction of motion of the sensor storage container 210, but the underwater vehicle 205 can be moving with a greater speed than the sensor storage container 210. In some instances, the underwater vehicle 205 and the sensor storage container 210 can be moving towards each other. The underwater vehicle 205 can control the relative velocity between the underwater vehicle 205 and the sensor storage container 210 to enable the first passive protrusion 235, the second passive protrusion 220, and the active protrusion 230 to align with the first passive receptacle 265, the second passive receptacle 270, and the active receptacle 271 on the sensor storage container 210.

Figure 7:
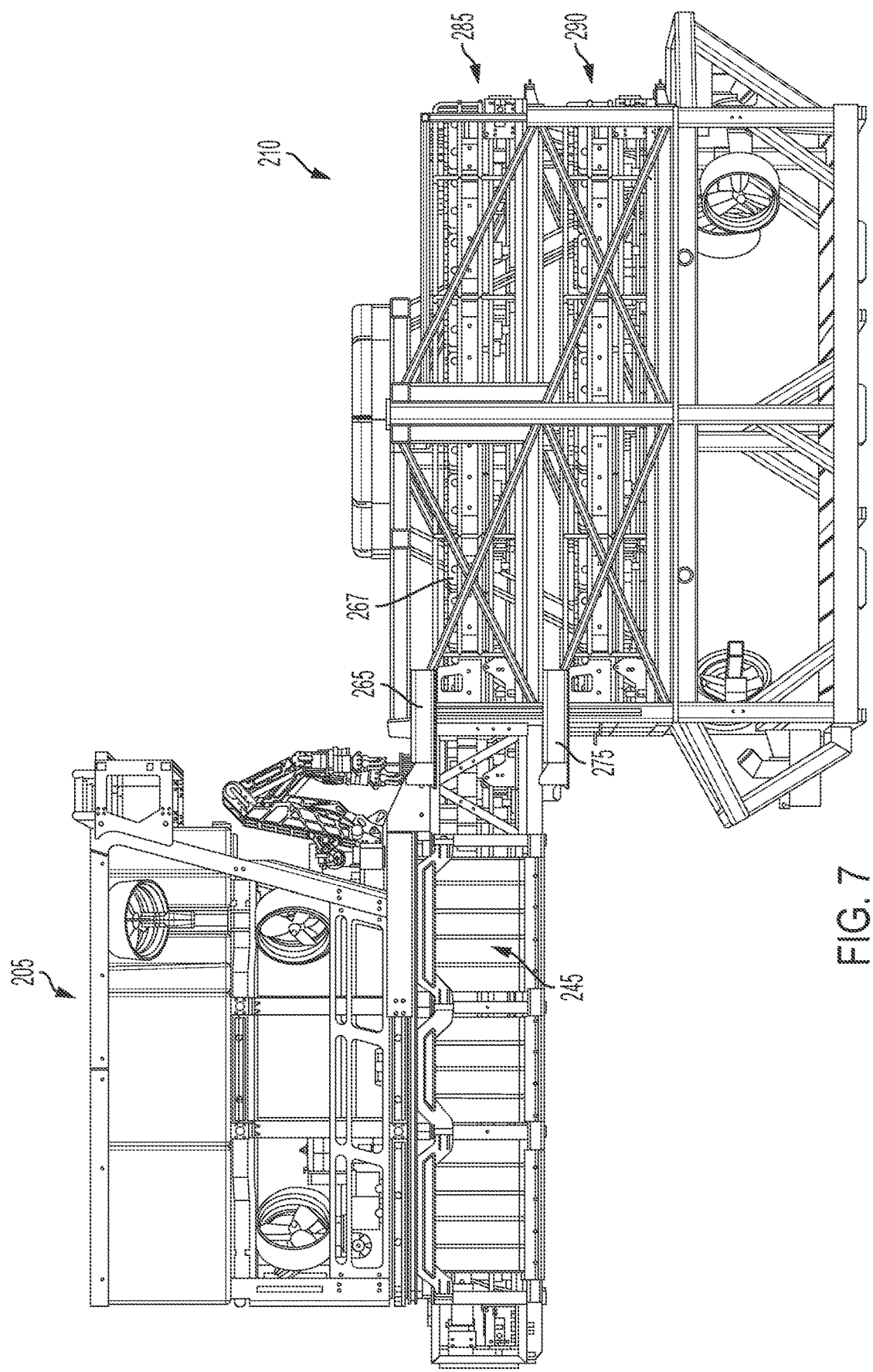
FIG. 7 shows a side view of an underwater vehicle and a sensor storage container in a coupled position in accordance with an embodiment.
Figure 8:
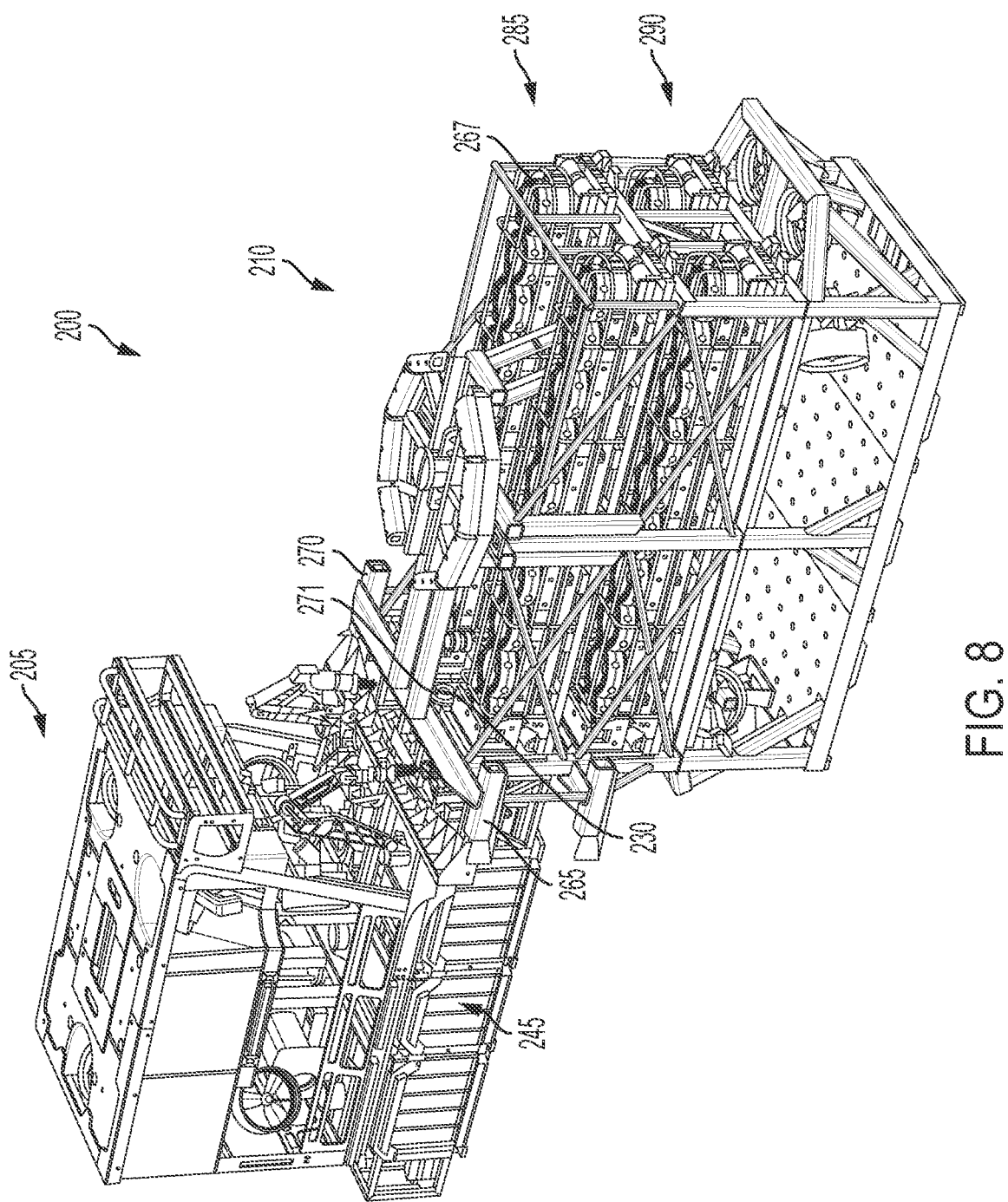
FIG. 8 depicts an isometric view of an underwater vehicle and a sensor storage container in a coupled position shown in FIG. 7.

FIG. 7 shows another side view of the system 200 shown in FIG. 2. In particular, FIG. 7 depicts the underwater vehicle 205 and the sensor storage container 210 underwater in a coupled position. In the coupled position shown in FIG. 7, the first passive protrusion 235 and the second passive protrusion 220 are engaged with the first passive receptacle 265 and the second passive receptacle 270. This causes the underwater vehicle storage compartment 245 to align with the first storage platform 285 of the sensor storage container 210. However, the first passive protrusion 235 and the second passive protrusion 220 may also instead engage with the third passive receptacle 275 and the fourth receptacle (405, FIG. 4), in which case the underwater vehicle storage compartment 245 would be aligned with the second storage platform 290 of the sensor storage container 210. Once coupled, the seismic data acquisition units 267 can be transferred between the underwater vehicle 205 and the storage container 210. FIG. 8 depicts an isometric view of the underwater vehicle 205 and the sensor storage container 210 in a coupled position shown in FIG. 7.

Figure 9:
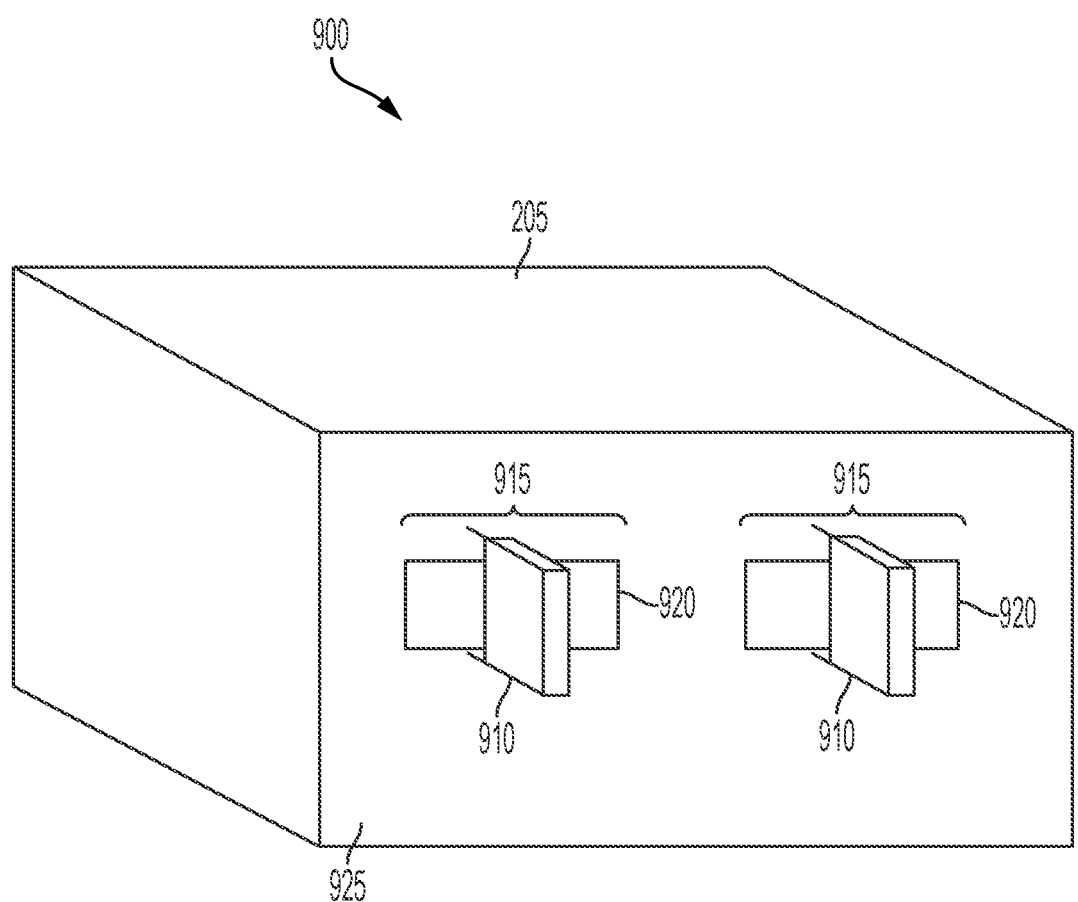
FIG. 9 illustrates a perspective view of an underwater vehicle having a propulsion system in accordance with an embodiment.

FIG. 9 illustrates a perspective view of an underwater vehicle having a propulsion system. The system 900 illustrated in FIG. 9 can be used, for example, to implement the underwater vehicle 35A shown in FIG. 1 or the underwater vehicle 205 shown in FIG. 2. The system 900 can include one or more steering devices 910 and one or more propulsion systems 105. The steering device 910 can steer or orient the underwater vehicle 205 as the propulsion device 915 generates force to move the TMS 50A.

The propulsion device 915 can include a force generation mechanism 920 (or thruster) to generate force, such as a propeller, a thruster, a paddle, an oar, a waterwheel, a screw propeller, a fixed pitch propeller, a variable pitch propeller, a ducted propeller, an azimuth propeller, a water jet, a fan, or a centrifugal pump. The force generation mechanism 920 can include a fluid propulsion system such as a pump-jet, hydrojet, or water jet that can generate a jet of water for propulsion. The force generation mechanism 920 can include a mechanical arrangement having a ducted propeller with a nozzle, or a centrifugal pump and nozzle. The force generation mechanism 920 can have an intake or inlet that allows water to pass into the propulsion device 915. The water can enter the pump of the propulsion system through the inlet. The water pressure inside the inlet can be increased by the pump and forced backwards through a nozzle. The propulsion device 915 can include a reversing bucket. With the use of a reversing bucket, reverse thrust can be generated. The reverse thrust can facilitate slowing movement of the TMS 50A as the movement of the vessel 5 slows.

The system 900 can include one or more propulsion systems 915. The propulsions system 915 can be integrated with, or mechanically coupled to, a portion of the underwater vehicle 205. The propulsion device 915 can be built into a portion of the underwater vehicle 205. The propulsion device 915 can be attached onto the portion of the underwater vehicle 205 using an attachment or coupling mechanism such as one or more screws, bolts, adhesives, grooves, latches, or pins.

The system 900 can include multiple propulsions. The multiple propulsions systems 915 can be centrally controlled or individually controlled by a control unit. The multiple propulsions systems can be independently activated or synchronously activated.

The system 900 can include a propulsion device 915 located on a portion of the underwater vehicle 205. For example, the propulsion device 915 can be located on a back end 925 of the underwater vehicle 205 that faces a direction opposite the direction of movement. The propulsion device 915 can be located in the center of the back end 925, on a left side of the back end 925 or a right side of the back end 925. The propulsion device 915 can, in some embodiments, span a width of the back end 925. The propulsion device 915 can be mechanically coupled to the back end 925, extend off from the back end 925, or be integrated or built-into the back end 925. The propulsions system 915 can be removably, mechanically coupled to the back end 925. The propulsions system 915 can be permanently or fixedly mechanically coupled to the back end 925. In some embodiments, the back end 325 can be removably coupled to the underwater vehicle 205, while the propulsion device 915 is fixedly coupled to, or integrated with, the back end 925.

The underwater vehicle 205 can include two propulsion systems 915 (or two propulsion systems 915 can be attached to the back end 925). For example, a first propulsions system can be located on the left side of the back end 925, and a second propulsion system can be located on the right side of the back end 925. The two propulsion systems 915 can be separated by a predetermined distance. The predetermined distance of separation can facilitate allowing the two propulsion systems 915 to move the system 900 in a direction. For example, the predetermined distance of separation can allow the two propulsion systems 915 to steer the underwater vehicle 205 by allowing a first propulsions system 915 to generate a greater force relative to a second propulsions system 915 on the back end 925. By generating different amounts of force, the two propulsion systems 915 can steer or control a direction of movement of the system 900 or underwater vehicle 205.

The different amounts of force generated by the two propulsion systems 915 on the underwater vehicle 205 can facilitate orienting the system 900 in a direction. For example, the two propulsion systems 915 can facilitate the movement of the underwater vehicle 205 in a direction toward the sensor storage container 210. For example, referring to FIG. 6, the propulsion systems 915 can facilitate the movement of the underwater vehicle 205 in the direction 605.

The system 900 can include one or more steering devices 910. The steering device 910 can refer to a steering apparatus 910 that includes multiple components. The steering device 910 can receive instructions from the propulsion device 915 or a control unit. The steering device 910 can include, for example, a rudder. In some embodiments, the steering device 910 can include fins or runners. For example, the steering device 910 can include an actuator, spring-mechanism, or hinge that can pivot, rotate or change the orientation of one or more of the fins, runners, or rudders to steer the underwater vehicle 205.

The steering device 910 can use the propulsion device 915, or component thereof, to steer the system 900. For example, the propulsion device 915 can include a nozzle and pump-jets. The nozzle can provide the steering of the pump-jets. Plates or rudders 910 can be attached to the nozzle in order to redirect the water flow from one side to another side (e.g., port and starboard; right and left). The steering device 910 can function similar to air thrust vectoring to provide a pumpjet-powered system 900 with increased agility in the aqueous medium.

Figure 10:
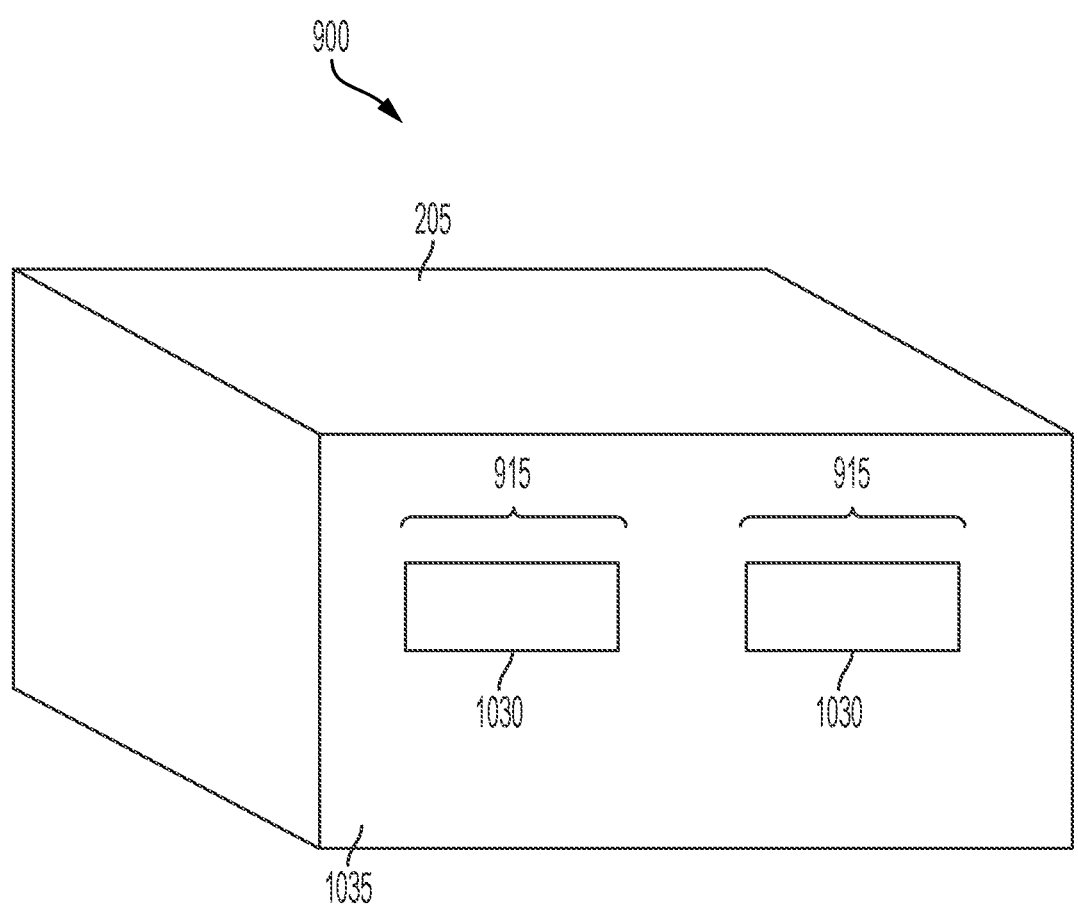
FIG. 10 depicts a front side perspective view of the underwater vehicle shown in FIG. 9.

FIG. 10 depicts a front side perspective view of the underwater vehicle 205 shown in FIG. 9. The propulsion device 915 can include a front end 1035 and a back end 925. The back end 925 can include an inlet, and the front end 1035 can include an outlet 1030. Water can go into the inlet and flow out of the outlet 1030. The propulsion device 915 can include an engine or a pump that receives water via the inlet, and pumps water out via outlet 1030 to form a jet stream that can generate force to move the underwater vehicle 205 thereof The force generation mechanism 920 of system 900 can include one or more pairs of inlets 920 and outlets 1030. The pair of inlet 920 and outlet 1030 can be located on the underwater vehicle 205. The inlet 920 can be connected to the outlet 1030 by a tube or pipe. An engine can be located in between the inlet 920 and outlet 1030 to generate force to draw water into the inlet and push water out of the outlet to thrust the underwater vehicle 205 or system 900 in the desired direction.

While FIGS. 9 and 10 discuss a propulsion system in relation to underwater vehicle 205, a similar propulsion system can be implemented to provide propulsion to the sensor storage container 210 shown in FIG. 2. The propulsion system can provide thrust to move the sensor storage container 210 in a direction towards the underwater vehicle 205 for coupling with the underwater vehicle 205.

Figure 11:
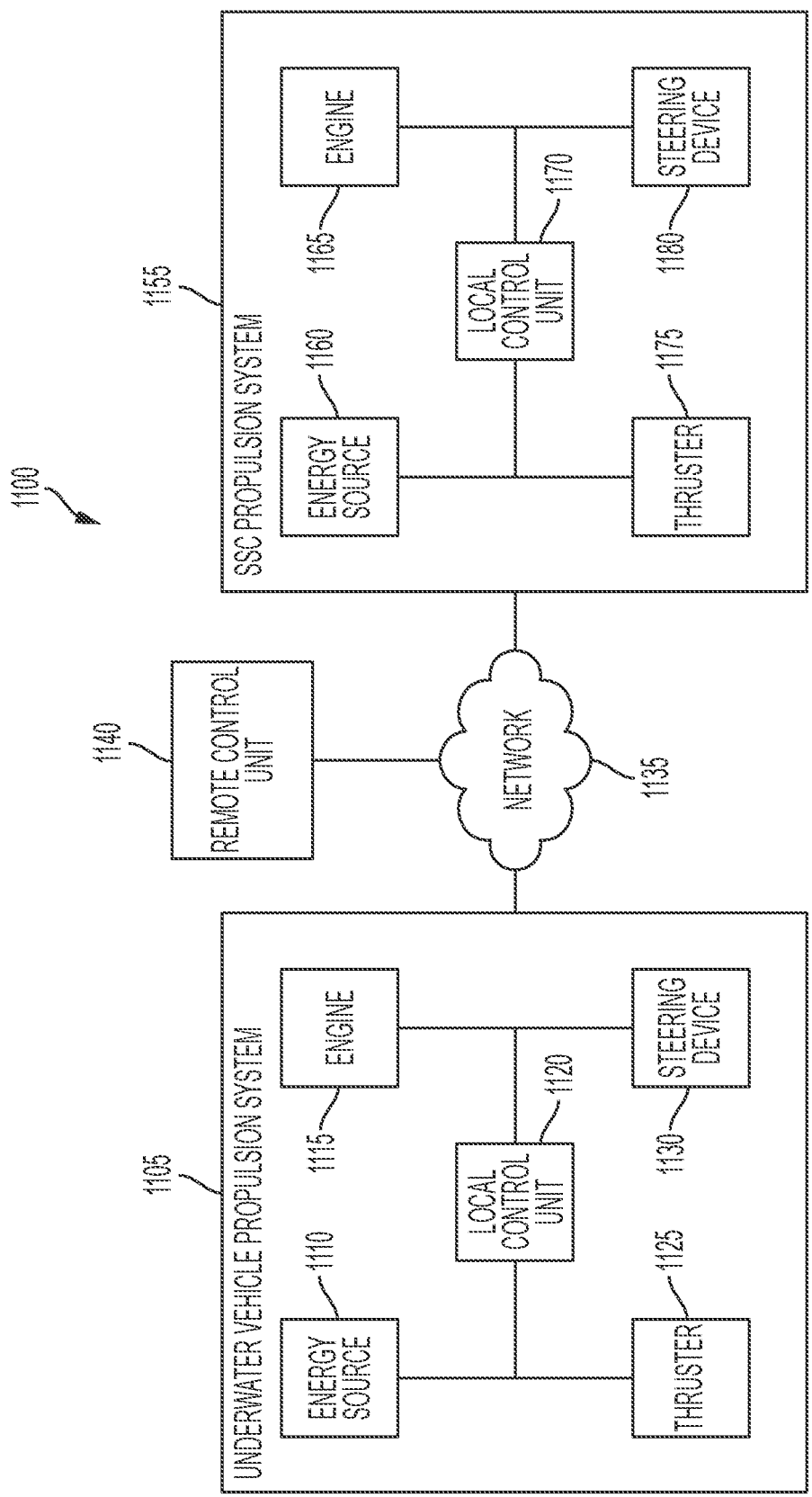
FIG. 11 shows a block diagram of an example system for deploying seismic sensor devices in accordance with an embodiment.

FIG. 11 shows a block diagram of an example system 1100 for deploying seismic sensor devices. The system 1100 can include an underwater vehicle propulsion system 1105 and a sensor storage container propulsion system 1155. Each of the underwater vehicle propulsion system 1105 and the sensor storage container propulsion system 1155 can include one or more system, component or functionality of propulsion device 915 depicted in FIGS. 3 and 4. The underwater vehicle propulsion system 1105 can include one or more of at least one energy source 1110, at least one local control unit 1120, at least one engine 1115, at least one thruster 1125, and at least one steering device 1130. The underwater vehicle propulsion system 1105 can communicate with a remote control unit 1140 via a network 1135. For example, the underwater vehicle propulsion system 1105 can receive, via network 1135, an instruction from remote control unit 1140 to generate force to move the underwater vehicle 215 towards the sensor storage container 210. The local control unit 1120 can receive the instruction and, responsive to the instruction, cause the engine 1115 to convert energy provided by the energy source 1110 into force. The engine 1115 can convey the energy or force to a thruster 1125, such as a propeller or pump. The thruster 1125 can include one or more component or functionality of propulsion device 915 depicted in FIGS. 3 and 4. Similarly, the sensor storage container propulsion system 1155 can also include an energy source 1160, an engine 1165, a local control unit 1170, one or more thrusters 1175, and a steering device 1180. The local control unit 1170 may also receive instructions, based on which it can control the sensor storage container 210 to move, for example, towards the underwater vehicle 205.

The energy source 1110 can include a battery, fuel, fossil fuel, petroleum, gasoline, natural gas, oil, coal, fuel cell, hydrogen fuel cell, solar cell, wave power generator, hydropower, or uranium atoms (or other fuel source for a nuclear reactor). The energy source 1110 can be located on the underwater vehicle 205. The energy source 1110 can be located on the vessel 5, and the vessel 5 can provide power to the engine 1115 via a power cable, such as the umbilical cable 44A. The energy source 1110 can include a sensor or monitor that measures an amount of power or fuel remaining in the energy source 1110. The sensor or monitor can provide an indication as to the amount of fuel or power remaining in the energy source 1110 to the local control unit 1120. The local control unit 1120 can conserve the energy source 1110 by reducing the amount of force generated using energy from the energy source. The local control unit 1120 can provide the indication of the amount of fuel remaining to the remote control unit 1140.

The underwater vehicle propulsion system 1105 can include an engine 1115. The engine 1115 can convert energy provided by the energy source 1110 to mechanical energy or force. The engine 1115 can convert the energy provided by the energy source 1110 to mechanical energy responsive to an instruction from the local control unit 1120 or remote control unit 1140. The engine 1115 can include a motor. The engine 1115 can include a heat engine, internal combustion engine, or external combustion engine. The engine 1115 can include an electric motor that converts electrical energy into mechanical motion. The engine 1115 can include a nuclear reactor that generates heat from nuclear fission. The engine 1115 can include a pneumatic motor that uses compressed air to generate mechanical motion. The engine 1115 can use chemical energy to create force.

The engine 1115 can transfer the mechanical energy to a thruster 1125. The thruster 1125 can include any device or mechanism that can generate force to move the underwater vehicle 205 in a desired direction through the aqueous medium. The thruster 1125 can include a propeller, a paddle, an oar, a waterwheel, a screw propeller, a fixed pitch propeller, a variable pitch propeller, a ducted propeller, an azimuth propeller, a water jet, a fan, or a pump. The engine 1115 can provide the thruster 1125 with mechanical energy to generate force. For example, the engine 1115 can provide mechanical energy to spin or rotate a propeller. The engine 1115 can provide mechanical energy to a pump to generate pressure to create a water jet that propels or move the underwater vehicle 205 in the desired direction.

The underwater vehicle propulsion system 1105 can include a steering device 1130 (e.g., steering device 910 shown in FIG. 9). The steering device 1130 can include a rudder or use a fin, plate or runner as a rudder. The steering device 1130 can steer by generating greater force on one side of the underwater vehicle 205 relative to another side. For example, the underwater vehicle 205 can have two propulsion systems 1105 or two thrusters 915 (FIGS. 9 and 10) separated by a distance. By generating greater force via one of the thrusters 915 relative to the other thruster 915, the underwater vehicle 205 can be steered through the aqueous medium.

The local control unit 1120 can monitor the speed or velocity of the underwater vehicle 205. The local control unit 1120 can include a GPS sensor, gyroscope, or accelerometer. The GPS sensor can receive GPS signals from a GPS satellite to determine a location of the underwater vehicle 205. The GPS sensor can provide the location information (e.g., latitude and longitude coordinates) to the local control unit 1120 or the remote control unit 1140. The accelerometer can determine an acceleration, speed or velocity of the underwater vehicle 205 (e.g., knots, nautical miles per hour, miles per hour, or meters per hour). The gyroscope can determine an orientation of the underwater vehicle 205. The local control unit 1120 can determine one or more of the location, velocity, or orientation from these components. The local control unit 1120 can use this information to determine how much force to generate to move the underwater vehicle 205. The local control unit 1120 can provide this information to the remote control unit 1140, which can, in-turn, process the information and provide instructions to the local control unit 1120.

The sensor storage container propulsion system 1155 can operate in a manner similar to that of the underwater vehicle propulsion system 1105. In particular, the local control unit 1170 of the sensor storage container propulsion system 1155 can provide propulsion to the sensor storage container 210 in the desired direction. The energy source 1160, the engine 1165, the local control unit 1170, the thruster 1175, and the steering device 1180 can operate in a manner similar to the corresponding components in the underwater vehicle propulsion system 1105.

The remote control unit 1140 can be external to the underwater vehicle propulsion system 1105 and the sensor storage container propulsion system 1155. For example, the remote control unit 1140 can be located on the vessel 5. The remote control unit 1140 can provide instructions to the underwater vehicle propulsion system 1105 and/or the sensor storage container propulsion system 1155 to move, direct, or slow down the underwater vehicle 205 and/or the sensor storage container 210. The remote control unit 1140 can receive an indication from a person or can automatically generate instructions based on a configuration, policy, or setting. For example, the remote control unit 1140 can be configured to instruct the underwater vehicle 205 or the sensor storage container 210 to follow the vessel 5 at a predetermined location relative to a portion of the vessel 5. The remote control circuit 1140 can also be configured to instruct the underwater vehicle 205 and/or the sensor storage container 210 to move towards each other to initiate transfer of seismic data acquisition units. The remote control unit 1140 can receive location information for the local control units 1120 and 1170 of the underwater vehicle propulsion system 1105 and the sensor storage container propulsion system 1155. The location information can include a velocity, location or orientation of the underwater vehicle 205 and the sensor storage container 210. The remote control unit 1140 can determine, based on the received locations, velocities, or orientation information, to provide instructions to the local control unit 1120 and the local control unit 1170 to adjust their locations, velocities or orientations.

The network 1135 can include a wired or wireless network. The network 1135 can include wires such as an umbilical cable 44A or a tether 70 from the vessel 5. Instructions can be conveyed via the network 1135 using one or more communication protocols. The network 1135 may be connected via wired or wireless links. Wired links may include Digital Subscriber Line (DSL), coaxial cable lines, or optical fiber lines. The wireless links may include BLU- ETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 1135 may be any type and/or form of network. The geographical scope of the network 1135 may vary widely and the network 1135 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 1135 may be an overlay network which is virtual and sits on top of one or more layers of other networks. The network 1135 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 1135 may be a type of a broadcast network, a telecommunications network, a data communication network, or a computer network. The network 1135 can include wireless communication technologies such as Bluetooth, Zigbee, or RFID. The network 1135 can allow for communication using small, low-power digital radios based on the IEEE 802.15.4 standard for WPANs, such as those based on the ZigBee standard. Systems based on the ZigBee standard can use radio-frequency (RF) and provide a long battery life and secure networking.

Figure 12:
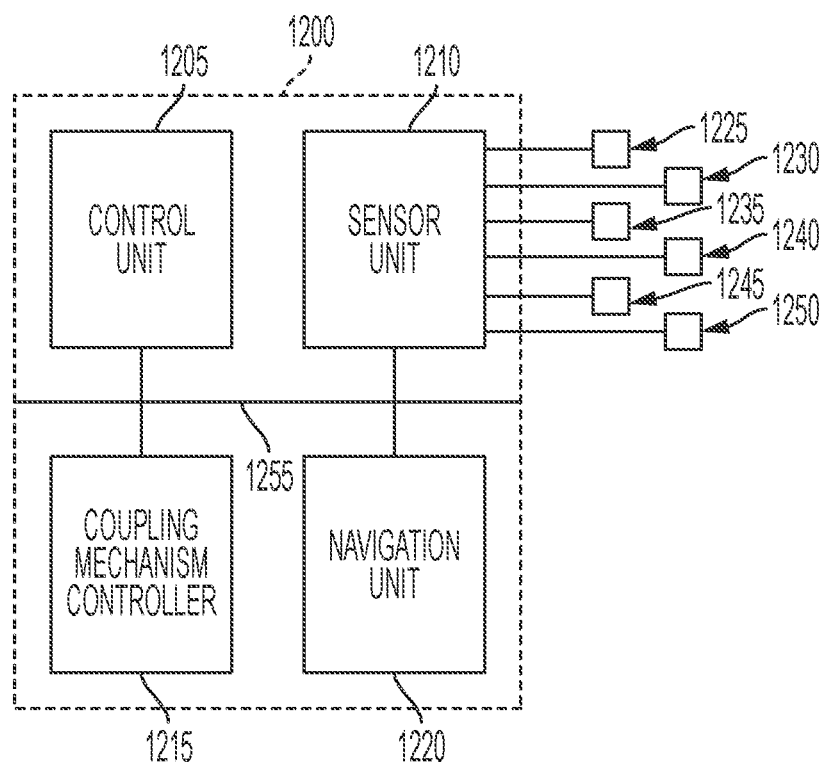
FIG. 12 shows a block diagram of a control circuitry of an underwater vehicle in accordance with an embodiment.

FIG. 12 shows a block diagram of a control circuitry 1200 of an underwater vehicle. For example, the control circuitry 1200 can be utilized to implement the control circuitry of the underwater vehicle 205 shown in FIG. 2. The control circuitry 1200 includes a control unit 1205, a sensor unit 1210, a coupling mechanism control unit 1215, and a navigation unit 1220. The sensor unit 1210 can be communicably connected to one or more sensors, such as, for example, a visual or image sensor 1225, an audio sensor 1230, an accelerometer 1235, sonar 1240, radar 1245, and a LIDAR 1250. The sensor unit 1210 can be communicably coupled to additional sensor such as a temperature sensor, a pressure sensor, a light meter, a photodiode, a pH sensor, etc. The control unit 1205, the sensor unit 1210, the coupling mechanism control unit 1215, and the navigation unit 1220 can communicate over a communication bus 1255. The control unit 1205 can control the various operations of the underwater vehicle 205 and can include programmable processors and memory, which can store data and programs that can be executed for the operation of the underwater vehicle 205.

The sensor unit 1210 can provide an interface for communicating with and receiving data from the sensors. In some examples, the control unit 1205 can request the sensor unit 1210 to provide a sensor reading from the various sensors coupled to the sensor unit 1210, in response to which the sensor unit 1210 can obtain the desired data from the appropriate sensor and provide the data to the control unit 1205. The navigation unit 1220 can control the navigation of the underwater vehicle 205. In some examples, the navigation unit 1220 can include the underwater vehicle propulsion system 1105 discussed above in relation to FIG. 11. In some examples, the control unit 1205 can provide GPS coordinates of a target location to the navigation unit 1220, which can control the propulsion system of the underwater vehicle 205 such that the underwater vehicle 205 can be navigated to the desired target location at a desired speed or within a desired time. The navigation unit 1220 also can provide the control unit 1205 with the current location or coordinates of the underwater vehicle 205. The coupling mechanism control unit 1215 can control the operation of the active protrusion 230 of the underwater vehicle 205. For example, the control unit 1205 can instruct to move a mechanical coupling pin of the active protrusion 230 into a second position from a first positon. In response, the coupling mechanism control unit 1215 can control one or more actuators (such as the hydraulic pump 565, FIG. 5) to move the mechanical coupling pin to the appropriate position. It is understood that functionality of the coupling mechanism control unit 1215 can be carried out by another unit within the control circuitry 1200.

The control unit 1205 also can control the underwater vehicle storage compartment 245 to move seismic data acquisition units in and out of the underwater vehicle storage compartment 245. In some examples, the underwater vehicle storage compartment 245 can include a conveyor mechanism, such as a conveyor belt, to provide seismic data acquisition units out the open end 225, and to receive seismic data acquisition units form the open end 225 of the underwater vehicle storage compartment 245. The control unit can send commands to the conveyor mechanism, which can begin to either provide seismic data acquisition units out through the open end 225 or to begin to receive seismic data acquisition units through the open end 225. In some examples, the control unit 1205 can be configured to send instructions to the conveyer mechanism to provide or receive seismic data acquisition units when the underwater vehicle 205 is successfully coupled to the sensor storage container 210. While not shown in FIG. 12, the control circuitry 1200 can communicate with a remote control unit, such as, for example, the remote control unit 1140 shown in FIG. 11, over a network, such as the network 1135 shown in FIG. 11.

The control unit 1205 can perform the coupling of the underwater vehicle 205 and the sensor storage container 210. The control unit 1205 may determine to couple the underwater vehicle 205 to the sensor storage container 210 based upon a determination that seismic data acquisition units are to be transferred between the underwater vehicle 205 and the sensor storage container 210. The transfer of the seismic data acquisition units can be either from the underwater vehicle 205 to the sensor storage container 210 or from the sensor storage container 210 to the underwater vehicle 205 based on the state of operation of the system

200. For example, during a seismic data acquisition unit deployment operation, the underwater vehicle 205 may run out of seismic data acquisition units stored in the storage compartment 245. The control unit 1205 may receive from the storage compartment 245 an indication that the underwater vehicle 205 has run out of seismic data acquisition units. In response, the control unit 1205 can control the underwater vehicle 205 to move towards the sensor storage container 210 to load additional seismic data acquisition units into the storage compartment 245. During a seismic data acquisition unit retrieval operation, the underwater vehicle storage compartment 245 may be filled to the capacity with seismic data acquisition units. The control unit 1205 may receive from the storage compartment 245 an indication that the underwater vehicle 205 is at capacity. In response, the control unit 1205 can control the underwater vehicle 205 to move towards the sensor storage container 201 to offload seismic data acquisition units.

The control unit 1205 can receive a current location of the sensor storage container 210. For example, the control unit 1205 can receive the current location of the sensor storage container 210 by directly communicating with the sensor storage container 210 over a network, such as the network 1135 discussed above in relation to FIG. 11. In some examples, the control unit 1205 can receive the current location of the sensor storage container 210 form the remote control unit 1140. The control unit 1205 may also determine the current location of the sensor storage container 210 using one or more sensors such as the image sensor 1225, the audio sensor 1230, sonar 1240, radar 1245, and the LIDAR 1250. Once the control unit 1205 determines the current location of the sensor storage container 210, the control unit 1205 can instruct the navigation unit 1220 to move the underwater vehicle 205 towards the current location of the sensor storage container 210. The navigation unit 1220 in turn can control the underwater vehicle propulsion system 1105 to move the sensor storage container 210 towards the location of the sensor storage container 210.

In some examples, the control unit 1205 can monitor the distance between the underwater vehicle 205 and the sensor storage container 210 while the underwater vehicle 205 is moving towards the sensor storage container 210. When the control unit 1205 can determines that the distance is less than a threshold distance, the control unit 1205 can instruct the navigation unit 1220 to orient the underwater vehicle 205 with respect to the sensor storage container 210, and may also instruct the navigation unit 1220 to reduce the speed of approach towards the sensor storage container 210. As an example, the control unit 1205 can instruct the navigation unit 1220 to orient the underwater vehicle 205 such that a front end of the underwater vehicle 205, on which the first passive protrusion 235, the second passive protrusion 220 and the active protrusion 230 are disposed, faces a front end of the sensor storage container 210 on which the first passive receptacle 265, the second passive receptacle 270 and the active receptacle 271 are disposed. The navigation unit 1220 can control the underwater vehicle propulsion system 1105 to orient the underwater vehicle 205 accordingly.

In some examples, the control unit 1205 can detect, based on an optical or acoustic signal, a location of the first and second passive receptacles 265 and 270 and the active receptacle 271. The optical signal can be received from the image sensor 1225, which the control unit 1205 can process to detect the shape of the first and second passive receptacles 265 and 270 and the active receptacle 271. Based on the detected shapes the control unit 1205 can detect the locations of the first and second passive receptacles 265 and 270 and the active receptacle 271. In some examples, one or more of the first and second passive receptacles 265 and 270 and the active receptacle 271 can include markings (e.g., high contrast colors, fluorescent colors, specific patterns, etc.) that can prominently appear in an image taken by the image sensor 1225. The control unit 1205 can process the image to detect the locations of these markings, and based on the location of the markings in the image, the control unit can determine the locations of the first and second passive receptacles 265 and 270 and the active receptacle 271. In some examples, the control unit can determine the locations of the first and second passive receptacles 265 and 270 and the active receptacle 271 based on acoustic signals received from the audio sensor 1230. One or more of the first and second passive receptacles 265 and 270 and the active receptacle 271 can have acoustic transmitters, the locations of which can be detected by the audio sensor 1230. The control unit 1205, based on the locations of the acoustic transmitters, can determine the locations of the first and second passive receptacles 265 and 270 and the active receptacle 271. In some examples, the control unit 1205 can determine the locations of the first and second passive receptacles 265 and 270 and the active receptacle 271 based also on the signals received from the sonar 1240, radar 1245, and the LIDAR 1250.

The control unit 1205, based on the determined locations of the passive receptacles and the active receptacle, can move the passive protrusions and the active protrusion towards the corresponding passive and active receptacles. The control unit 1205, based on the locations of the first and second passive receptacles 265 and 270 and the active receptacle 271 can instruct the navigation unit 1220 to move the underwater vehicle 205 such that the first passive protrusion 235 is aligned with the first passive receptacle 265, the second passive protrusion 220 is aligned with the second passive receptacle 270 and the active protrusion 230 is aligned with the active receptacle 271. The navigation unit 1220, in turn, can instruct the underwater vehicle propulsion system 1105 to move the underwater vehicle 205 in the appropriate position such that the passive protrusions are aligned with the passive receptacles, and the active protrusion is aligned with the active receptacle.

The control unit 1205 can monitor the relative position of the underwater vehicle 205 and the sensor storage container 210 using one or more sensors while the underwater vehicle 205 is moved towards the sensor storage container 210 to receive feedback on the movement of the underwater vehicle 205. For example, the control unit 1205 can monitor any misalignment between the protrusions and the receptacles while the underwater vehicle 205 is moving towards the sensor storage container 210. Based on the feedback, the control unit 1205 can compare the current position of the underwater vehicle 205 with the desired position of the underwater vehicle 205, and determine the correction needed. The corrections can be provided to the navigation unit 1220, which can control the underwater vehicle propulsion system 1105 to impart corrections in the movement of the underwater vehicle 205.

The control unit 1205 can continue to move the underwater vehicle 205 towards the sensor storage container 210 until the first passive protrusion 235 and the second passive protrusion 220 enter the open ends of the first passive receptacle 265 and the second passive receptacle 270, respectively; and the active protrusion 230 engages with the active receptacle 271. The control unit 1205 can determine the proximity of the underwater vehicle 205 to the sensor storage container 210 based on the one or more sensors. In some examples, once the control unit 1205 detects that the passive protrusions (235 and 220) are inserted into the passive receptacles (265 and 270) and the active protrusion 230 is engaged with the active receptacle 271, the control unit 1205 can instruct the coupling mechanism control unit 1215 to couple the underwater vehicle 205 with the sensor storage container 210. For example, the coupling mechanism control unit 1215 can actuate a mechanical coupling pin to move from a first position to a second position to execute a locking mechanism. Referring to FIG. 5, the coupling mechanism control unit 1215 can actuate the hydraulic pump 565 such that the first mechanical pin 570 and the second mechanical pin 575 moves from a first position to a second position, and securing a plate of the active receptacle 271 securely on the surface 560.

In some examples, the active protrusion 230 can include a self-locking mechanism to couple the mechanical pin with the active receptacle. As discussed above in relation to FIG. 5, the mechanical assembly 510 of the active protrusion 500 can include a self-locking mechanism that causes the first and the second mechanical pins 570 and 575 to move downwards to a second position in which the plate of the active receptacle 271 is secured over the engaging surface 560.

In some examples, the control unit 1205 can instruct the coupling mechanism control unit 1215 to lock the active protrusion 230 with the active receptacle 271 subsequent to the passive protrusion coupling with the passive receptacle. For example, the control unit 1205 can detect whether the first passive protrusion 235 has coupled with the first passive receptacle 265 by detecting the extent to which the first passive protrusion 235 has entered into the opening of the first passive receptacle 265. To that end, the first passive protrusion 235 can include one or more detectors, such as proximity detectors, metal detectors, image sensors, acoustic sensors, or other sensors, to detect the extent to which the first end 310 has entered along the length of the first passive receptacle 265. For example, the first passive protrusion 235 can include one or more proximity sensor positioned near the second end 315. When the second end 315 makes contact or is in proximity with the first end 320 of the first passive receptacle 265, the proximity sensor at the second end 315 can send a signal to the sensor unit 1210, which in turn can send the signal to the control unit 1205. The receipt of the signal form the proximity sensor can indicate that the first passive protrusion 235 is sufficiently engaged and coupled with the first passive receptacle 265. Subsequent to determining that the first passive protrusion 235 is coupled with the first passive receptacle 265, the control unit 1205 can instruct the coupling mechanism control unit 1215 to actuate the active protrusion 230 such that the active protrusion is coupled with the active receptacle 271 of the sensor storage container 210.

In some examples, the control unit 1205 unit can perform a verification process to determine a level of coupling between the underwater vehicle 205 and the sensor storage container 210. For example, the control unit 1205 can perform the verification process subsequent to the active protrusion 230 of the underwater vehicle 205 coupling with the active receptacle 271 of the sensor storage container 210. The verification process can ensure that the underwater vehicle 205 and the sensor storage container 210 are securely coupled, and to reduce the risk of the underwater vehicle 205 decoupling with the sensor storage container 210 during transfer of seismic data acquisition units. In some examples, the control unit 1205 can carry out the verification process by determining the level of coupling of the active protrusion 230 with the active receptacle 271. In some examples, the control unit 1205 can move the underwater vehicle 205 in a direction opposite to the sensor storage container 210 to determine a level of coupling between the underwater vehicle 205 and the sensor storage container 210. If moving the underwater vehicle 205 away from the sensor storage container 210 does not result in disengagement between the active protrusion 230 and the active receptacle 271, the control unit 1205 can determine that the level of coupling is satisfactory. On the other hand, if the active protrusion 230 disengages with the active receptacle 271, the control unit 1205 can determine that the level of coupling is not satisfactory. In some examples, the control unit 1205 can also consider the disengagement between the passive protrusions and the passive receptacles to determine whether level of coupling between the underwater vehicle 205 and the sensor storage container 210.

The control unit 1205 can control the storage compartment 245 to transfer at least one of the seismic data acquisition units from a storage compartment 245 to the sensor storage container 210 that is coupled with the underwater vehicle 205 via the passive protrusion and the passive receptacle, and the active protrusion and the active receptacle. The control unit 1205 can control the storage compartment 245 to transfer seismic data acquisition units the mechanical pins of the active protrusion 230 have moved from the first position to the second position. This can ensure that that the seismic data acquisition units are not being transferred without a coupling between the underwater vehicle 205 and the sensor storage container 210. The control unit 1205 can actuate a conveyor mechanism in the storage compartment 245 to move seismic data acquisition units from the storage compartment 245 to the first platform 285 of the sensor storage container 210. In some instances, where the underwater vehicle 205 has been coupled with the sensor storage container 210 to load seismic data acquisition units, the control unit 1205 can actuate the conveyor mechanism in the storage compartment 245 such that the seismic data acquisition units from the sensor storage container 210 are transferred into the storage compartment 245. The control unit 1205 may also communicate with a corresponding control unit of the sensor storage container 210 to facilitate the transfer of seismic data acquisition units.

Figure 13:
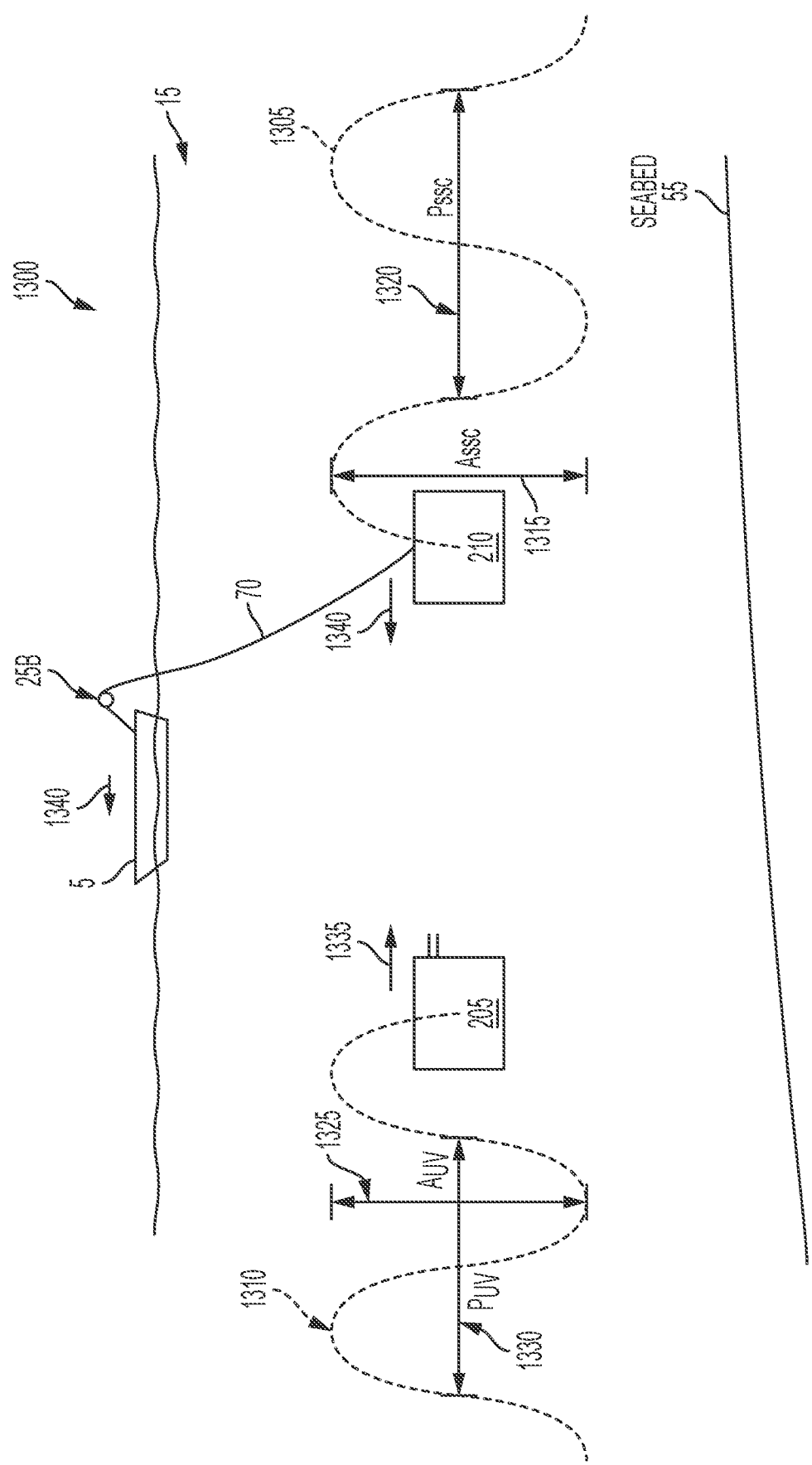
FIG. 13 shows a side view of a system to interface underwater components in a seismic survey in accordance with an embodiment.

During the approach to the sensor storage container 210, the control unit 1205 can control the movement of the underwater vehicle 205 to match the movement of the sensor storage container 210. For example, FIG. 13 shows a system 1300 for coupling an underwater vehicle 205 with a sensor storage container 210. The sensor storage container 210 is positioned under the surface of the ocean 15, and tethered to the surface vessel 5 by a cable 70 that is connected to the crane 25B on the vessel 5. The control unit 1205 can detect the location of the sensor storage container 210 and instruct the navigation unit 1220 to move the underwater vehicle 205 towards the sensor storage container 210. In some instances, due to the environmental conditions, such as ocean currents, surface conditions, and the ocean terrain, the sensor storage container 210 may have a vertical component to its movement. For example, FIG. 13 shows a trace of the sensor storage container path 1305 under the surface of the ocean. The vessel 5, moving in the direction indicated by the arrow 1340 tows the sensor storage container 210 in the same direction under the ocean surface. However, the environmental conditions cause the sensor storage container 210 to move in an upward and downward motion while also moving in the direction 1340. In some instances, coupling the underwater vehicle 205 with the sensor storage container 210, while the sensor storage container 210 is moving up and down in the vertical direction may be risky. In instances where the vertical movement of the sensor storage container 210 is large and at a high rate, coupling may not be possible at all. To reduce this risk, the control unit 1205 can move the underwater vehicle 205 such that the vertical movement of the underwater vehicle 205 matches the vertical movement of the sensor storage container 210. By matching the vertical movement of the underwater vehicle 205 and the sensor storage container 210, risks in coupling the underwater vehicle 205 with the sensor storage container 210 can be reduced.

The control unit 1205 can determine a period and amplitude of an oscillation of the sensor storage container 210, and exert a force on the underwater vehicle 205 to match a period and amplitude of an oscillation of the underwater vehicle 205 to the period and amplitude of the oscillation of the sensor storage container 210. In some examples, the control unit 1205 can determine the period and amplitude of oscillations of the sensor storage container 210 by directly measurement. For example, in some instances, the control unit 1205 can utilize one or more sensors coupled to the sensor unit 1210, such as the image sensor 1225, the audio sensor 1230, sonar 1240, radar 1245, and the LIDAR 1250 to determine a period ($P_{ssc}$) 1320 and an amplitude ($A_{ssc}$) 1315 of the oscillations of the path 1305 of the sensor storage container 210. Once the period 1320 and the amplitude 1315 of the oscillations of the path of the sensor storage container 210 are known, the control unit 1205 can instruct the navigation unit 1220 control the underwater vehicle 205 such that the underwater vehicle 205 can oscillate with the same period and amplitude. For example, as shown in FIG. 13, a path 1310 traced by the underwater vehicle 205 has an amplitude ($A_{uv}$) 1325 and a period ($P_{uv}$) 1330 while the underwater vehicle 205 is moving in the direction 1335 towards the sensor storage container 210. The navigation unit 1220 can instruct the underwater vehicle propulsion system 1105 to control the thrusters and the steering of the propulsion system such that the amplitude 1325 and the period 1330 of the underwater vehicle 205 changed to match the amplitude 1315 and period 1320, respectively, of the path of the sensor storage container 210.

In some instances, the sensor storage container 210 can include an accelerometer to detect periodic vertical motion of the sensor storage container 210. As an example, the sensor storage container can include an accelerometer, such as the accelerometer 1235 included in the underwater vehicle 205, to provide signals in response to the vertical motion of sensor storage container 210. A control unit, such as the local control unit 1170, shown in FIG. 11, can receive the signals form the accelerometer and determine that the sensor storage container 210 is undergoing periodic vertical motion. The control unit of the sensor storage container 210 can also include a wireless transmitter to transmit the indication of the periodic vertical motion of the sensor storage container 210 to the underwater vehicle 205. In some instances the wireless transmitter can be an optical transmitter. In some examples, the wireless transmitter can be an acoustic transmitter. The underwater vehicle 205 can include a wireless receiver to receive the indication from the transmitter on the sensor storage container 210. The wireless receiver can include, for example, an optical receiver and an acoustic receiver. The control unit 1205, in response to receiving the indication from the sensor storage container 210 that the sensor storage container 210 is oscillating in a vertical direction, can determine the amplitude and period of oscillations of the sensor storage container 210, and match the amplitude and period of oscillations of the underwater vehicle 205 to that of the sensor storage container 210, as discussed above.

In some examples, the control unit 2105 can receive, from a marine vessel, an indication of a periodic vertical motion of the sensor storage container 210. The marine vessel can be a surface vessel, such as, for example, the vessel 5 shown in FIG. 1. The control unit 2105 can receive a communication from the vessel 5 via a tether 46A indicating the periodic vertical motion of the sensor storage container 210. In some examples, the control unit 2105 can receive the communication from the vessel 5 from the remote control unit 1140 positioned on the vessel 5 via a network (1135, FIG. 11). The control unit 1205, in response to receiving the indication from the vessel 5 that the sensor storage container 210 is oscillating in a vertical direction, can determine the amplitude and period of oscillations of the sensor storage container 210, and match the amplitude and period of oscillations of the underwater vehicle 205 to that of the sensor storage container 210, as discussed above. In some examples, the communication from the vessel 5 may include the values of the amplitude and the period of oscillations of the sensor storage container 210. In such instances, the control unit 2105 can match the amplitude and period of oscillation of the underwater vehicle 205 to the values of amplitude and period received from the vessel 5.

In some examples, a heave winch located on the marine vessel can provide active or passive heave control to maintain amplitude of an oscillation of the sensor storage compartment within a threshold. The sensor storage container 210 can be coupled to a surface vessel, such as, for example, the vessel 5 shown in FIG. 1, via a cable or a tether. The surface vessel can include a winch, such as an active heave winch, to provide active heave compensation to the sensor storage container 210. The cable or the tether connecting the sensor storage container 210 can be spooled around the winch. The winch can be, for example, an active heave compensation winch, which can rotated to spool-in or spool-out the cable or tether to control the movement of the sensor storage container 210 underwater. A control system of the heave compensation winch can monitor the amplitude of the oscillations of the sensor storage container 210, and in response control the direction of rotation and the speed of rotation of the winch to reduce the amplitude of oscillations. For example, the control system can rotate the winch to spool-in the cable or tether during the downward movement of the sensor storage container 210, and rotate the winch in the opposite direction during the upward movement of the sensor storage container 210. The speed of rotation of the winch can be controlled based on a rate of change in the amplitude of the oscillation of the sensor storage container 210.

Figure 14:
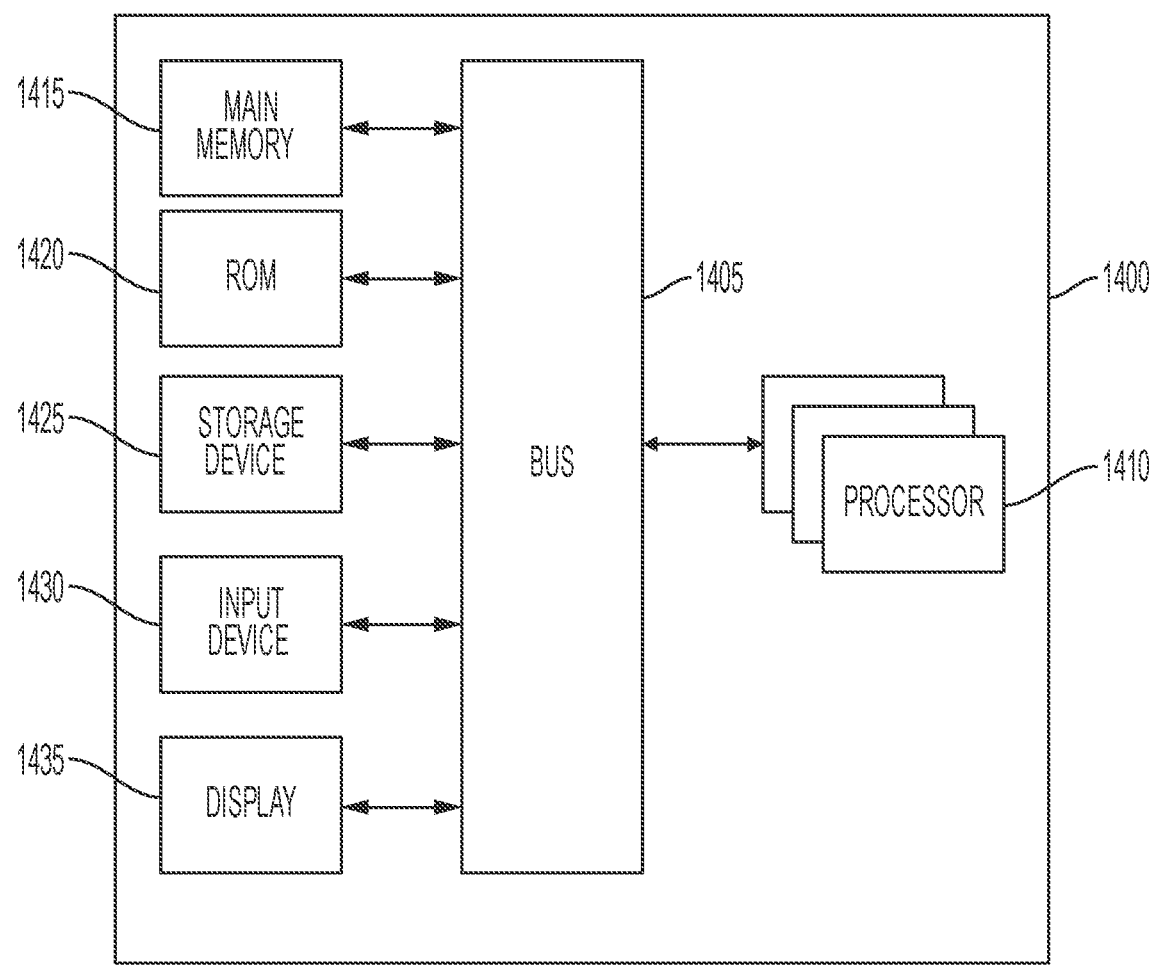
FIG. 14 depicts a block diagram of an architecture for a computing system employed to implement, or function with, various elements of the systems, methods or components depicted in FIGS. 1-13 and 15.

FIG. 14 is a block diagram of a computer system 1400 in accordance with an embodiment. The computer system or computing device 1400 can be used to implement one or more control unit, sensor, interface or remote control of system 200, system 500, system 900, system 1100, system 1200, or system 1300. The computing system 1400 includes a bus 1405 or other communication component for communicating information and a processor 1410a-n or processing circuit coupled to the bus 1405 for processing information. The computing system 1400 can also include one or more processors 1410 or processing circuits coupled to the bus for processing information. The computing system 1400 also includes main memory 1415, such as a random access memory (RAM) or other dynamic storage device, coupled to the bus 1405 for storing information, and instructions to be executed by the processor 1410. Main memory 1415 can also be used for storing seismic data, binning function data, images, reports, tuning parameters, executable code, temporary variables, or other intermediate information during execution of instructions by the processor 1410. The computing system 1400 may further include a read only memory (ROM) 1420 or other static storage device coupled to the bus 1405 for storing static information and instructions for the processor 1410. A storage device 1425, such as a solid state device, magnetic disk or optical disk, is coupled to the bus 1405 for persistently storing information and instructions.

The computing system 1400 may be coupled via the bus 1405 to a display 1435 or display device, such as a liquid crystal display, or active matrix display, for displaying information to a user. An input device 1430, such as a keyboard including alphanumeric and other keys, may be coupled to the bus 1405 for communicating information and command selections to the processor 1410. The input device 1430 can include a touch screen display 1435. The input device 1430 can also include a cursor control, such as a mouse, a trackball, or cursor direction keys, for communicating direction information and command selections to the processor 1410 and for controlling cursor movement on the display 1435.

The processes, systems and methods described herein can be implemented by the computing system 1400 in response to the processor 1410 executing an arrangement of instructions contained in main memory 1415. Such instructions can be read into main memory 1415 from another computer-readable medium, such as the storage device 1425. Execution of the arrangement of instructions contained in main memory 1415 causes the computing system 1400 to perform the illustrative processes described herein. One or more processors in a multi-processing arrangement may also be employed to execute the instructions contained in main memory 1415. In some embodiments, hard-wired circuitry may be used in place of or in combination with software instructions to effect illustrative implementations. Thus, embodiments are not limited to any specific combination of hardware circuitry and software.

Although an example computing system has been described in FIG. 14, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While various inventive embodiments have been described and illustrated herein, those of ordinary skill in the art will readily envision a variety of other means or structures for performing the function or obtaining the results or one or more of the advantages described herein, and each of such variations or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, or configurations will depend upon the specific application or applications for which the inventive teachings are used. The foregoing embodiments are presented by way of example, and within the scope of the appended claims and equivalents thereto other embodiments may be practiced otherwise than as specifically described and claimed. The systems and methods described herein are directed to each individual feature, system, article, material, or kit, described herein. In addition, any combination of two or more such features, systems, articles, materials, kits, or methods, if such features, systems, articles, materials, kits, or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Generally, program modules include routines, programs, objects, components, data structures, or other components that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." References to "or" may be construed as inclusive so that any terms described using "or" may indicate any of a single, more than one, and all of the described terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B,") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A system to interface underwater components in a seismic survey, comprising:
    an underwater vehicle located in an aqueous medium, the underwater vehicle comprising:
        a storage compartment storing a plurality of seismic data acquisition units;
        a propulsion system to move the underwater vehicle;
        a passive protrusion extending from the underwater vehicle; and
        an active protrusion extending from the underwater vehicle, the active protrusion comprising a mechanical coupling pin that moves from a first position to a second position to provide a locking mechanism;
    a sensor storage container located in the aqueous medium and tethered, via a cable, to a marine vessel that travels with a velocity greater than zero, the storage container comprising:
        a passive receptacle to receive the passive protrusion from the underwater vehicle; and
        an active receptacle to receive the active protrusion and the mechanical coupling pin to provide the locking mechanism to couple the storage container with the underwater vehicle, wherein the sensor storage container and the underwater vehicle are coupled to one another above a seabed and below a surface of the aqueous medium; and
    the active protrusion comprising a plate positioned on an engaging surface and a self-locking mechanism to automatically couple the mechanical coupling pin with the active receptacle;
    the active receptacle configured to contact the engaging surface;
    the mechanical coupling pin configured to press downward on the plate to secure the active receptacle against the engaging surface; and
    the underwater vehicle configured to transfer at least one of the plurality of seismic data acquisition units from the storage compartment to the sensor storage container coupled with the underwater vehicle via the passive protrusion and the passive receptacle and the active protrusion and the active receptacle.

2. The system of claim 1, comprising:
    the underwater vehicle comprising a second passive protrusion; and
    the sensor storage container comprising a second passive receptacle to receive the second passive protrusion.

3. The system of claim 1, comprising:
    the underwater vehicle comprising a second passive protrusion; and
    the sensor storage container comprising a second passive receptacle to receive the second passive protrusion,
    wherein the passive protrusion and the second passive protrusion each have a length greater than a length of the active protrusion.

4. The system of claim 1, wherein the active protrusion locks with the active receptacle subsequent to the passive protrusion coupling with the passive receptacle.

5. The system of claim 1, comprising the underwater vehicle to:
    perform, subsequent to the active protrusion of the underwater vehicle coupled with the active receptacle of the sensor storage container, a verification process to determine a level of coupling between the underwater vehicle and the sensor storage container.

6. The system of claim 1, comprising the underwater vehicle to:
    move, subsequent to the active protrusion of the underwater vehicle coupled with the active receptacle of the sensor storage container, in a direction opposite to the sensor storage container to determine a level of coupling between the underwater vehicle and the sensor storage container.

7. The system of claim 1, comprising the propulsion system of the underwater vehicle to:
    detect, based on an optical or acoustic signal, a location of the passive receptacle and the active receptacle; and move the passive protrusion and the active protrusion towards a corresponding passive receptacle and the active receptacle.

8. The system of claim 1, comprising the propulsion system of the underwater vehicle to:
determine a period and an amplitude of an oscillation of the sensor storage container; and
exert a force on the underwater vehicle to match the period and the amplitude of the oscillation of the underwater vehicle.

9. The system of claim 1, comprising:
the sensor storage container comprising:
an accelerometer to detect a periodic vertical motion of sensor storage container; and
a wireless transmitter to transmit an indication of the periodic vertical motion to the underwater vehicle; and
the underwater vehicle comprising:
a wireless receiver to receive the indication of the periodic vertical motion from the underwater vehicle; and
the propulsion system to move the underwater vehicle to match the periodic vertical motion of the sensor storage container.

10. The system of claim 1, comprising the propulsion system of the underwater vehicle to:
receive, from the marine vessel, an indication of a periodic vertical motion of the sensor storage container; and
move the underwater vehicle to match the periodic vertical motion of the sensor storage container.

11. The system of claim 1, comprising:
a heave winch located on the marine vessel to provide active or passive heave control to maintain an amplitude of an oscillation of the sensor storage container within a threshold.

12. The system of claim 1, comprising:
the plurality of seismic data acquisition units stored in the storage compartment of the underwater vehicle comprising a first seismic data acquisition unit stacked on a second seismic data acquisition unit via one or more cleat rings; and
the underwater vehicle to transfer the first seismic data acquisition unit stacked on the second seismic data acquisition unit to the sensor storage container.

13. The system of claim 1, comprising the underwater vehicle to:
identify an environmental condition associated with the aqueous medium, the seabed, or the sensor storage container;
determine, based on a policy and the environmental condition, to initiate transfer of the plurality of seismic data acquisition units to the sensor storage container; and
transfer, responsive to the determination based on the policy and the environmental condition, the plurality of seismic data acquisition units from the storage compartment to the sensor storage container.

14. The system of claim 13, wherein the environmental condition comprises at least one of an oscillation of the sensor storage container, an oscillation of the underwater vehicle, a topography of the seabed.

15. A system to interface underwater components in a seismic survey, comprising:
an underwater vehicle located in an aqueous medium, the underwater vehicle comprising:
a storage compartment storing a plurality of seismic data acquisition units;
a propulsion system to move the underwater vehicle;
a first passive interlocking mechanism;
a second passive interlocking mechanism;
a first active interlocking mechanism; and
an active protrusion comprising a plate positioned on an engaging surface and a self-locking mechanism to automatically couple a mechanical coupling pin with an active receptacle, the active receptacle configured to contact the engaging surface and the mechanical coupling pin configured to press downward on the plate to secure the active receptacle against the engaging surface;
a sensor storage container located in the aqueous medium and tethered, via a cable, to a marine vessel that travels with a velocity greater than zero, the sensor storage container comprising:
a third passive interlocking mechanism to couple with the first passive interlocking mechanism;
a fourth passive interlocking mechanism to couple with the second passive interlocking mechanism;
a second active interlocking mechanism to couple with the first active interlocking mechanism; and
the underwater vehicle configured to transfer at least one of the plurality of seismic data acquisition units from the storage compartment to the sensor storage container coupled with the underwater vehicle, wherein the sensor storage container and the underwater vehicle are coupled to one another above a seabed and below a surface of the aqueous medium.

16. The system of claim 15, comprising:
the first active interlocking mechanism comprising a self-locking latch mechanism.

17. The system of claim 15, comprising:
the second active interlocking mechanism comprising a self-locking latch mechanism.

18. A method of interfacing underwater components in a seismic survey, comprising:
providing an underwater vehicle located in an aqueous medium, the underwater vehicle comprising:
a storage compartment storing a plurality of seismic data acquisition units;
a propulsion system to move the underwater vehicle towards a sensor storage container;
a first passive interlocking mechanism;
a second passive interlocking mechanism;
a first active interlocking mechanism; and
an active protrusion comprising a plate positioned on an engaging surface and a self-locking mechanism to automatically couple a mechanical coupling pin with an active receptacle, the active receptacle configured to contact the engaging surface and the mechanical coupling pin configured to press downward on the plate to secure the active receptacle against the engaging surface;
providing the sensor storage container located in the aqueous medium and tethered, via a cable, to a marine vessel traveling with a velocity greater than zero, the sensor storage container comprising:
a third passive interlocking mechanism to couple with the first passive interlocking mechanism;
a fourth passive interlocking mechanism to couple with the second passive interlocking mechanism; and
a second active interlocking mechanism to couple with the first active interlocking mechanism; and transferring, from the underwater vehicle to the sensor storage container coupled with the underwater vehicle above a seabed and below a surface of the aqueous medium, at least one of the plurality of seismic data acquisition units from the storage compartment.

19. The method of claim 18, comprising:

identifying, by the underwater vehicle, a characteristic of oscillation of a sensor storage compartment;

moving, by the underwater vehicle, to match the characteristic of oscillation of the sensor storage compartment;

determining, by the underwater vehicle, that the characteristic of oscillation of the underwater vehicle matches the characteristic of oscillation of the sensor storage compartment; and transferring, responsive to the determining that the characteristic of oscillation of the underwater vehicle matches the characteristic of oscillation of the sensor storage compartment, the plurality of seismic data acquisition units from the storage compartment to the sensor storage container.

* * * * *